United States Patent
Siddiqui et al.

(10) Patent No.: US 10,735,698 B2
(45) Date of Patent: Aug. 4, 2020

(54) SYSTEMS AND METHODS FOR CONVERTING NON-BAYER PATTERN COLOR FILTER ARRAY IMAGE DATA

(71) Applicant: QUALCOMM Incorporated, San Diego, CA (US)

(72) Inventors: Hasib Ahmed Siddiqui, San Diego, CA (US); Kalin Mitkov Atanassov, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/236,006

(22) Filed: Dec. 28, 2018

(65) Prior Publication Data

US 2019/0141299 A1    May 9, 2019

Related U.S. Application Data

(63) Continuation-in-part of application No. 15/941,759, filed on Apr. 19, 2017, now Pat. No. 10,313,640.
(Continued)

(51) Int. Cl.
*H04N 5/235* (2006.01)
*G06T 7/90* (2017.01)
(Continued)

(52) U.S. Cl.
CPC .............. *H04N 9/04* (2013.01); *G02B 5/201* (2013.01); *G06T 3/4015* (2013.01); *G06T 7/60* (2013.01);
(Continued)

(58) Field of Classification Search
CPC ...... H04N 9/04; H04N 5/2258; H04N 5/2355; H04N 5/2352; G06T 7/60; G06T 2207/20024; G02B 5/201
See application file for complete search history.

(56) References Cited

U.S. PATENT DOCUMENTS

| 4,167,750 A | 9/1979 | Tomimoto et al. |
| 4,949,166 A | 8/1990 | Isnardi |

(Continued)

FOREIGN PATENT DOCUMENTS

| EP | 2753082 A1 | 7/2014 |
| EP | 2833635 A1 | 2/2015 |

(Continued)

OTHER PUBLICATIONS

Condat L, "A New Class of Color Filter Arrays with Optimal Sensing Properties," Dec. 1, 2008 (Dec. 1, 2008), XP55269827, Retrieved from the Internet: URL:https://hal.archives-ouvertes.fr/hal-00347433v2/document [retrieved on May 2, 2016], 15 pages.
(Continued)

*Primary Examiner* — Hung H Lam
(74) *Attorney, Agent, or Firm* — Paradice and Li LLP

(57) ABSTRACT

Aspects of the present disclosure relate to systems and methods for determining a resampler for resampling or converting non-Bayer patter color filter array image data to Bayer pattern image data. An example device may include a camera having an image sensor with a non-Bayer pattern color filter array configured to capture non-Bayer pattern image data for an image. The example device also may include a memory and a processor coupled to the memory. The processor may be configured to receive the non-Bayer pattern image data from the image sensor, divide the non-Bayer pattern image data into portions, determine a sampling filter corresponding to the portions, and determine, based on the determined sampling filter, a resampler for converting non-Bayer pattern image data to Bayer-pattern image data.

30 Claims, 21 Drawing Sheets

Related U.S. Application Data which is a continuation of application No. 14/864,554, filed on Sep. 24, 2015, now Pat. No. 9,681,109.

(60) Provisional application No. 62/207,704, filed on Aug. 20, 2015.

(51) Int. Cl.
| | |
|---|---|
| *H04N 9/04* | (2006.01) |
| *G06T 3/40* | (2006.01) |
| *H04N 5/225* | (2006.01) |
| *G06T 7/60* | (2017.01) |
| *G02B 5/20* | (2006.01) |

(52) U.S. Cl.
CPC ............ *G06T 7/90* (2017.01); *H04N 5/2258* (2013.01); *H04N 5/2352* (2013.01); *H04N 5/2355* (2013.01); *H04N 9/04515* (2018.08); *H04N 9/04551* (2018.08); *G06T 2207/20024* (2013.01)

(56) References Cited

U.S. PATENT DOCUMENTS

| | | | |
|---|---|---|---|
| 4,991,003 A | 2/1991 | Sendelweck | |
| 5,130,798 A | 7/1992 | Christopher | |
| 6,791,615 B1 | 9/2004 | Shiomi et al. | |
| 7,733,375 B2 | 6/2010 | Mahowald et al. | |
| 8,644,603 B2 | 2/2014 | Singh et al. | |
| 8,761,504 B2 | 6/2014 | Hirakawa et al. | |
| 8,873,847 B2 | 10/2014 | Alacoque | |
| 9,681,109 B2 | 6/2017 | Siddiqui et al. | |
| 2003/0156228 A1 | 8/2003 | Lee et al. | |
| 2004/0189796 A1* | 9/2004 | Ho | H04N 13/261 348/51 |
| 2005/0219587 A1* | 10/2005 | Hayaishi | H04N 1/6027 358/1.9 |
| 2007/0177236 A1 | 8/2007 | Kijima et al. | |
| 2007/0229682 A1 | 10/2007 | Nishide | |
| 2009/0102935 A1 | 4/2009 | Hung et al. | |
| 2010/0238313 A1* | 9/2010 | Ohki | H04N 5/232 348/222.1 |
| 2011/0193733 A1 | 8/2011 | Kuramochi et al. | |
| 2013/0064448 A1 | 3/2013 | Tomaselli et al. | |
| 2016/0073076 A1 | 3/2016 | Carroll | |
| 2017/0237951 A1 | 8/2017 | Siddiqui et al. | |
| 2017/0295372 A1* | 10/2017 | Lawrence | H04N 19/132 |

FOREIGN PATENT DOCUMENTS

| | | |
|---|---|---|
| EP | 3327665 A1 | 5/2018 |
| WO | WO-2011119893 A2 | 9/2011 |

OTHER PUBLICATIONS

Condat L, "A New Color Filter Array With Optimal Properties for Noiseless and Noisy Color Image Acquisition," IEEE Transactions On Image Processing, IEEE Service Center, Piscataway, NJ, US, Aug. 1, 2011 (Aug. 1, 2011), vol. 20(8), pp. 2200-2210, XP011329862, ISSN: 1057-7149, DOI: 10.1109/TIP.2011.2114355 abstract p. 2201-p. 2204.
Dubois E, "Frequency-Domain Methods for Demosaicking of Bayer-Sampled Color Images", IEEE Signal Processing Letters,Dec. 2005, vol. 12, No. 12, pp. 847-850.
Hirakawa K., et al., "Adaptive homogeneity-directed demosaicing algorithm", In Proc. IEEE Int. Conf. Image Processing, Mar. 2005, vol. 14, No. 3, pp. 360-369.
Hirakawa K., et al., "Spatio-Spectral Color Filter Array Design for Optimal Image Recovery", IEEE Transactions on Image Processing, Feb. 2008, pp. 1876-1890.
International Search Report and Written Opinion—PCT/US2016/043346—ISA/EPO—dated Dec. 2, 2016.
Lu Y.M., et al., "Optimal Color Filter Array Design: Quantitative Conditions and an Efficient Search Procedure", IS&T/SPIE Electronic Imaging, International Society for Optics and Photonics, 2009, 8 Pages.
Lukac R., et al., "Color Filter Arrays: Design and Performance Analysis", IEEE Transactions on Consumer Electronics,Nov. 2005, vol. 51, No. 4, pp. 1260-1267.
Wan G., et al., "CMOS image sensors with multi-bucket pixels for computational photography", IEEE Journal of Solid-State Circuits, Apr. 2012, vol. 47, No. 4, pp. 1031-1042.
Wang J., et al., "New Color Filter Arrays of High Light Sensitivity and High Demosaicking Performance," Image Processing (ICIP), 2011 18th Ieee International Conference On, IEEE, Sep. 11, 2011 (Sep. 11, 2011), pp. 3153-3156, XP032080342, DOI: 10.1109/ICIP. 2011.6116336 ISBN: 978-1-4577-1304-0 abstractpage 3154-p. 3155.
International Search Report and Written Opinion—PCT/US2019/062671—ISA/EPO—Feb. 3, 2020.

\* cited by examiner

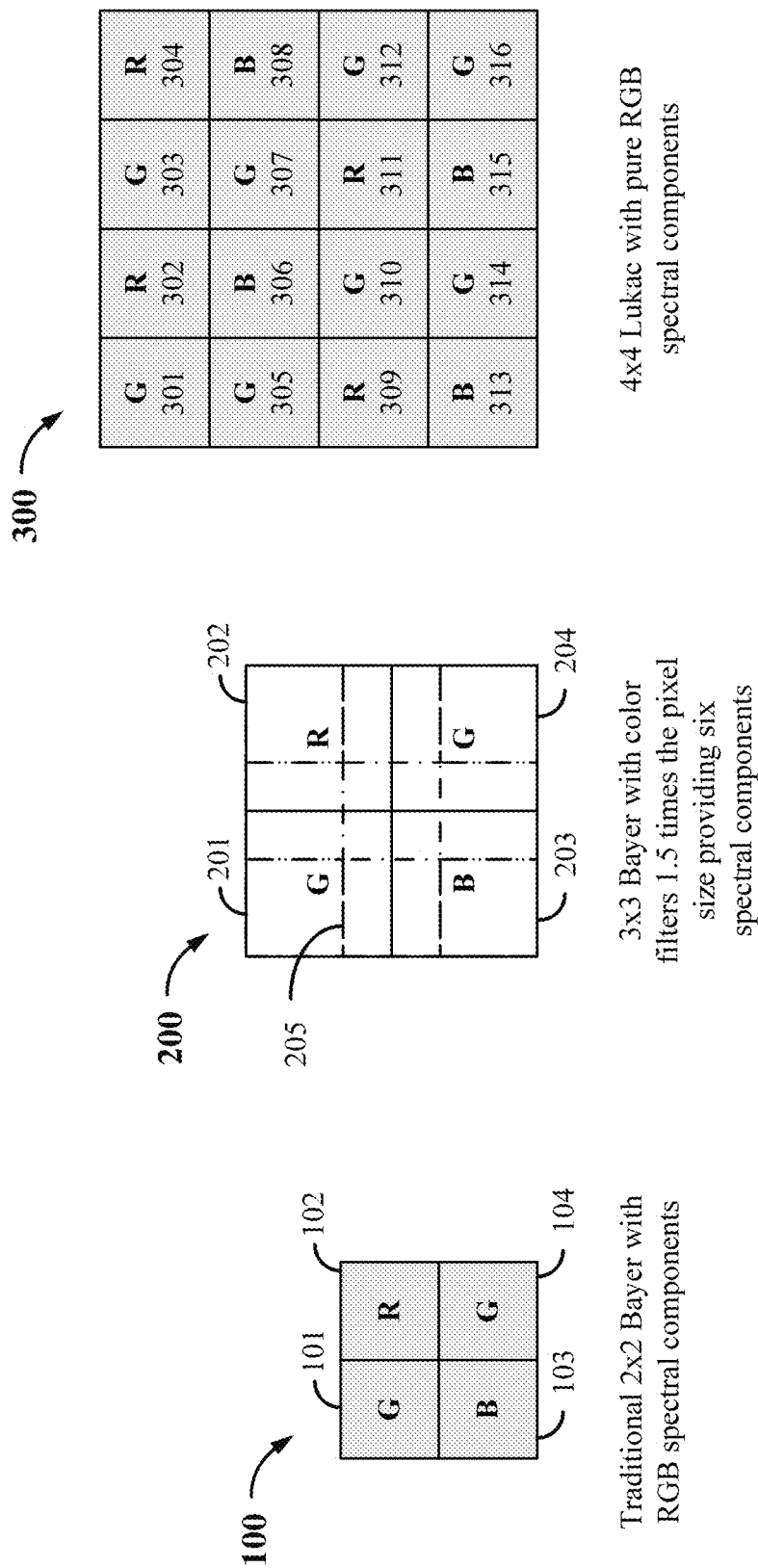

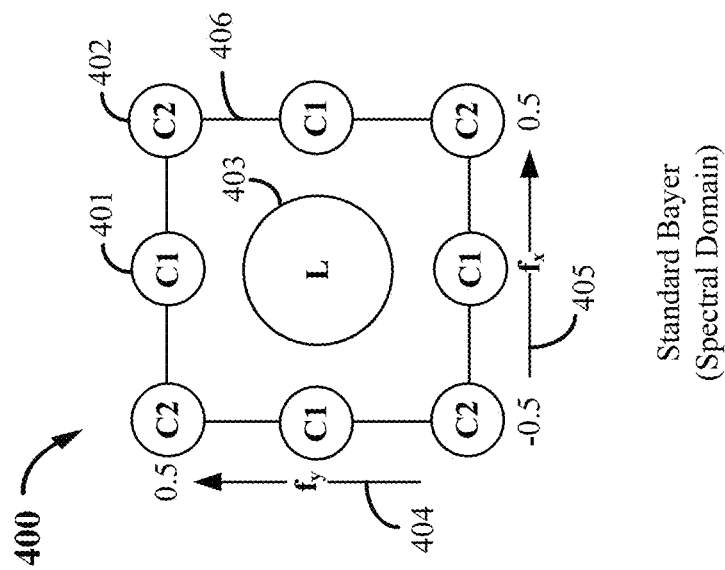
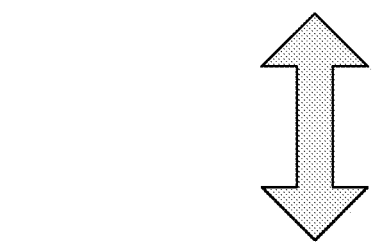
FIG. 4

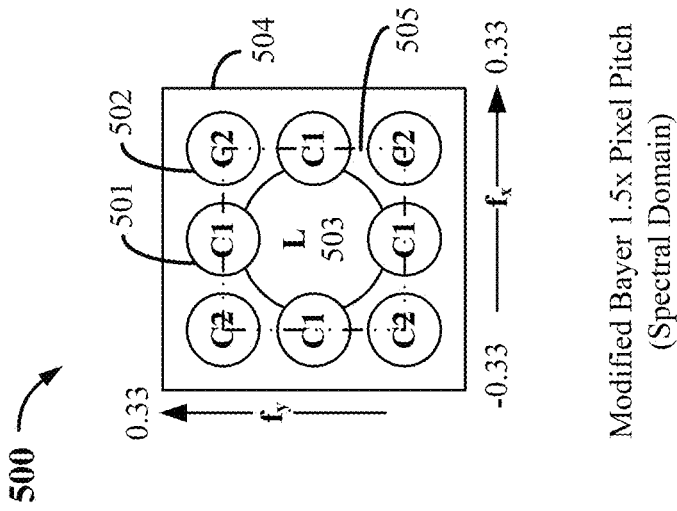
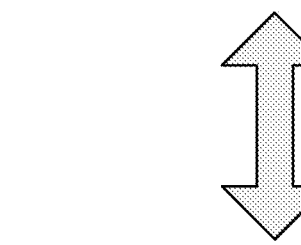
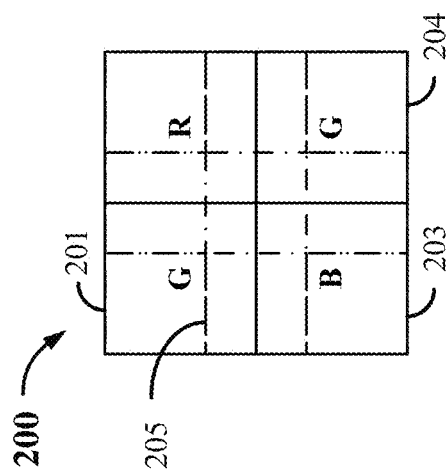
FIG. 5

1300 ⟶

```
┌─────────────────────────────────────────────┐
│ RECEIVE INFORMATION INDICATING A CONFIGURTION OF │
│ SENSOR ELEMENTS OF AN IMAGE SENSOR AND A    │
│ CONFIGURATION OF FILTERS FOR THE SENSOR ELEMENTS. │
│                    1305                      │
└─────────────────────────────────────────────┘
                      │
                      ▼
┌─────────────────────────────────────────────┐
│ GENERATE A MODULATION FUNCTION BASED ON THE │
│ CONFIGURATION OF SENSOR ELEMENTS AND THE    │
│ CONFIGURATION OF FILTERS. 1310              │
└─────────────────────────────────────────────┘
                      │
                      ▼
┌─────────────────────────────────────────────┐
│ DEMODULATE IMAGE DATA BASED ON THE GENERATED │
│ MODULATION FUNCTION TO DETERMINE CHROMINANCE │
│ AND LUMINANCE COMPONENTS OF THE FIRST IMAGE. 1315 │
└─────────────────────────────────────────────┘
                      │
                      ▼
┌─────────────────────────────────────────────┐
│ GENERATE A TRIPLE PLANE IMAGE BASED ON THE  │
│ DETERMINED CHROMINANCE AND LUMINANCE        │
│ COMPONENTS. 1320                            │
└─────────────────────────────────────────────┘
```

Sample, by a non-Bayer CFA image sensor, light from a scene for an image capture of the scene.  1702

Resample the image data from the non-Bayer CFA image sensor.  1704

Generate, based on the resampling, resampled image data in a Bayer pattern. 1706

Process the resampled image data in a Bayer pattern to generate an image. 1708

```
Sample, by a non-Bayer CFA image sensor, a known test image.  1802
                              │
                              ▼
Divide the samplings of the test image from the non-Bayer CFA image
              sensor into portions.  1804
                              │
                              ▼
Determine a sampling filter corresponding to the sampling portions.  1806
                              │
                              ▼
Determine a resampler based on the determined sampling filter.  1808
```

|  |  |  |  |  |
|---|---|---|---|---|
| 0 | 0 | -1 | 0 | 0 |
| 0 | 0 | 4 | 0 | 0 |
| -1 | 4 | -12 | 4 | -1 |
| 0 | 0 | 4 | 0 | 0 |
| 0 | 0 | -1 | 0 | 0 |

FIG. 21

SYSTEMS AND METHODS FOR CONVERTING NON-BAYER PATTERN COLOR FILTER ARRAY IMAGE DATA

CROSS-REFERENCE TO RELATED APPLICATIONS

This patent application is a continuation-in-part application, claiming priority to commonly owned U.S. patent application Ser. No. 15/491,759 entitled "SYSTEMS AND METHODS FOR CONFIGURABLE DEMODULATION" filed on Apr. 19, 2017, which claims priority to U.S. patent application Ser. No. 14/864,554 entitled "SYSTEMS AND METHODS FOR CONFIGURABLE DEMODULATION" filed on Sep. 24, 2015 and issued on Jun. 13, 2017, as U.S. Pat. No. 9,681,109, which claims priority to U.S. Provisional Patent Application No. 62/207,704 entitled "UNIVERSAL DEMOSAIC" filed on Aug. 20, 2015. The applications are assigned to the assignee hereof. The disclosure of the prior applications is considered part of and is incorporated by reference in this patent application.

TECHNICAL FIELD

The present application relates generally to conversion of non-Bayer pattern image data from an image sensor to Bayer pattern image data for image process and color interpolation.

BACKGROUND OF RELATED ART

Devices including or coupled to one or more digital cameras use a camera lens to focus incoming light onto a camera sensor for capturing digital images. The curvature of a camera lens places a range of depth of the scene in focus. Portions of the scene closer or further than the range of depth may be out of focus, and therefore appear blurry in a captured image. The distance of the camera lens from the camera sensor (the "focal length") is directly related to the distance of the range of depth for the scene from the camera sensor that is in focus (the "focus distance"). Many devices are capable of adjusting the focal length, such as by moving the camera lens to adjust the distance between the camera lens and the camera sensor, and thereby adjusting the focus distance.

Many devices automatically determine the focal length. For example, a user may touch an area of a preview image provided by the device (such as a person or landmark in the previewed scene) to indicate the portion of the scene to be in focus. In response, the device may automatically perform an autofocus (AF) operation to adjust the focal length so that the portion of the scene is in focus. The device may then use the determined focal length for subsequent image captures (including generating a preview).

A demosaicing (also de-mosaicing, demosaicking, or debayering) algorithm is a digital image process used to reconstruct a color image from output from an image sensor overlaid with a CFA. The demosaic process may also be known as CFA interpolation or color reconstruction. Most modern digital cameras acquire images using a single image sensor overlaid with a CFA, so demosaicing may be part of the processing pipeline required to render these images into a viewable format. To capture color images, photo sensitive elements (or sensor elements) of the image sensor may be arranged in an array and detect wavelengths of light associated with different colors. For example, a sensor element may be configured to detect a first, a second, and a third color (e.g., red, green and blue ranges of wavelengths). To accomplish this, each sensor element may be covered with a single color filter (e.g., a red, green or blue filter). Individual color filters may be arranged into a pattern to form a CFA over an array of sensor elements such that each individual filter in the CFA is aligned with one individual sensor element in the array. Accordingly, each sensor element in the array may detect the single color of light corresponding to the filter aligned with it.

The Bayer pattern has typically been viewed as the industry standard, where the array portion consists of rows of alternating red and green color filters and alternating blue and green color filters. Usually, each color filter corresponds to one sensor element in an underlying sensor element array.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Universal CFA resampling algorithm may be based on maximum a-posteriori (MAP) estimation that can be configured to resample arbitrary CFA patterns to a Bayer grid. Our proposed methodology involves pre-computing the inverse matrix for MAP estimation; the pre-computed inverse is then used in real-time application to resample the given CFA pattern. The high PSNR values of the reconstructed full-channel RGB images demonstrate the effectiveness of such implementations.

In one aspect, a demosaicing system for converting image data generated by an image sensor into an image, is disclosed. The system includes an electronic hardware processor, configured to receive information indicating a configuration of sensor elements of the image sensor and a configuration of filters for the sensor elements, generate a modulation function based on a configuration of sensor elements and the configuration of filters, demodulate the image data based on the generated modulation function to determine chrominance and luminance components of the image data, and generate the image based on the determined chrominance and luminance components.

In some aspects, the electronic hardware processor is further configured to generate a set of configuration parameters based on the modulation function, extract a set of chrominance components from the image data using the set of configuration parameters, demodulate the chrominance components into a set of baseband chrominance components using the set of configuration parameters, modulate the set of baseband chrominance components to determine a set of carrier frequencies, extract a luminance component from the image data using the set of carrier frequencies. The image is generated based on the extracted luminance component and the determined set of baseband chrominance components. The configuration of the image sensor may further comprise one or more of the following a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a method for converting image data generated by an image sensor into a second image. The method comprises receiving information indicating a configuration of sensor elements of the image sensor and a configuration of filters for the sensor elements, generating a modulation function based on a configuration of sensor elements and the configuration of filters, demodulating the image data based on the generated modulation function to determine chrominance and luminance components of the image data; and generating the second image based on the determined chrominance and luminance components. In some aspects, the method also includes generating a set of configuration parameters based on the determined modulation function, extracting a set of chrominance components from the image data using the set of configuration parameters, demodulating the set of chrominance components into a set of baseband chrominance components using the set of configuration parameters, modulating the set of baseband chrominance components to determine a set of carrier frequencies, and extracting a luminance component from the image data using the set of carrier frequencies, wherein the generation of the second image is based on the extracted luminance component and the set of baseband chrominance components.

In some aspects, the configuration of the image sensor is defined by one or more of the following: a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a non-transitory computer-readable medium comprising code that, when executed, causes an electronic hardware processor to perform a method of converting image data generated by an image sensor into a second image. The method includes receiving information indicating a configuration of sensor elements of the image sensor and a configuration of filters for the sensor elements, generating a modulation function based on a configuration of sensor elements and the configuration of filters, demodulating the image data based on the generated modulation function to determine chrominance and luminance components of the image data; and generating the second image based on the determined chrominance and luminance components. In some aspects, the method further includes generating a set of configuration parameters based on the determined modulation function; extracting a set of chrominance components from the image data using the set of configuration parameters; demodulating the set of chrominance components into a set of baseband chrominance components using the set of configuration parameters; modulating the set of baseband chrominance components to determine a set of carrier frequencies; extracting a luminance component from the image data using the set of carrier frequencies. The generation of the second image is based on the extracted luminance component and the set of baseband chrominance components.

In some aspects, the configuration of the image sensor is defined by one or more of the following: a period of filter elements comprising at least one filter element, each filter element comprising a spectral range, and the array of filter elements comprising a repeating pattern of the period of filter elements, a size of each filter element having a length dimension and a width dimension that is different than a respective length dimension and a respective width dimension of a corresponding sensor element of the image sensor, and an array of dynamic range sensor elements, each dynamic range sensor element having an integration time, wherein the integration time controls a level of sensitivity of the corresponding dynamic range sensor element. In some aspects, the determination of the modulation function is based on at least one of the period of filter elements, the size of each filter element, and the array of dynamic range sensor elements.

Another aspect disclosed is a demosaicing apparatus for converting an image data generated by an image sensor into a second image. The apparatus includes means for receiving information indicating a configuration of sensor elements of the image sensor and a configuration of filters for the sensor elements, means for generating a modulation function based on a configuration of sensor elements and the configuration of filters, means for demodulating the image data based on the generated modulation function to determine chrominance and luminance components of the image data; and means for generating an image based on the determined chrominance and luminance components.

Another example device may include a camera having an image sensor with a non-Bayer pattern color filter array configured to capture non-Bayer pattern image data for an image. The example device also may include a memory and a processor coupled to the memory. The processor may be configured to receive the non-Bayer pattern image data from the image sensor, divide the non-Bayer pattern image data into portions, determine a sampling filter corresponding to the portions, and determine, based on the determined sampling filter, a resampler for converting non-Bayer pattern image data to Bayer-pattern image data.

Another example method may include capturing, by an image sensor with a non-Bayer pattern color filter array, non-Bayer pattern image data for an image. The method also may include dividing the non-Bayer pattern image data into portions. The method further may include determining a sampling filter corresponding to the portions. The method also may include determining, based on the determined sampling filter, a resampler for converting non-Bayer pattern image data to Bayer-pattern image data.

An example computer readable medium may be non-transitory and store one or more programs containing instructions that, when executed by one or more processors of a device, cause the device to perform operations. The operations may include capturing, by an image sensor with a non-Bayer pattern color filter array, non-Bayer pattern image data for an image. The operations further may include dividing the non-Bayer pattern image data into portions, determining a sampling filter corresponding to the portions, and determining, based on the determined sampling filter, a resampler for converting non-Bayer pattern image data to Bayer-pattern image data.

Another example device may include means for receiving non-Bayer pattern image data for an image from an image sensor with a non-Bayer pattern color filter array, means for dividing the non-Bayer pattern image data into portions, means for determining a sampling filter corresponding to the portions, and means for determining, based on the determined sampling filter, a resampler for converting non-Bayer pattern image data to Bayer-pattern image data.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 1 illustrates a simplified example of a 2×2 Bayer CFA pattern with RGB spectral components having a 1:1 ratio to the image sensor components.

FIG. 2 illustrates a simplified example of a 3×3 Bayer CFA pattern with RGB spectral components having a 1.5:1 ratio to the image sensor components.

FIG. 3 illustrates a simplified example of a 4×4 Lukac CFA pattern with RGB spectral components having a 1:1 ration to the image sensor components.

FIG. 4 illustrates an example of a Fourier spectrum representation of FIG. 1.

FIG. 5 illustrates an example of a Fourier spectrum representation of FIG. 2.

FIG. 13A is a flowchart of a method for converting an image data generated by an image sensor into a second image.

FIG. 17 is an illustrative flow chart depicting an example operation for generating image data in a Bayer pattern from image data sampled by a non-Bayer CFA image sensor.

FIG. 18 is an illustrative flow chart depicting an example operation for determining a CFA resampler (resampler) to be used in mapping non-Bayer CFA image sensor samplings to Bayer pattern image data.

Figure 21:
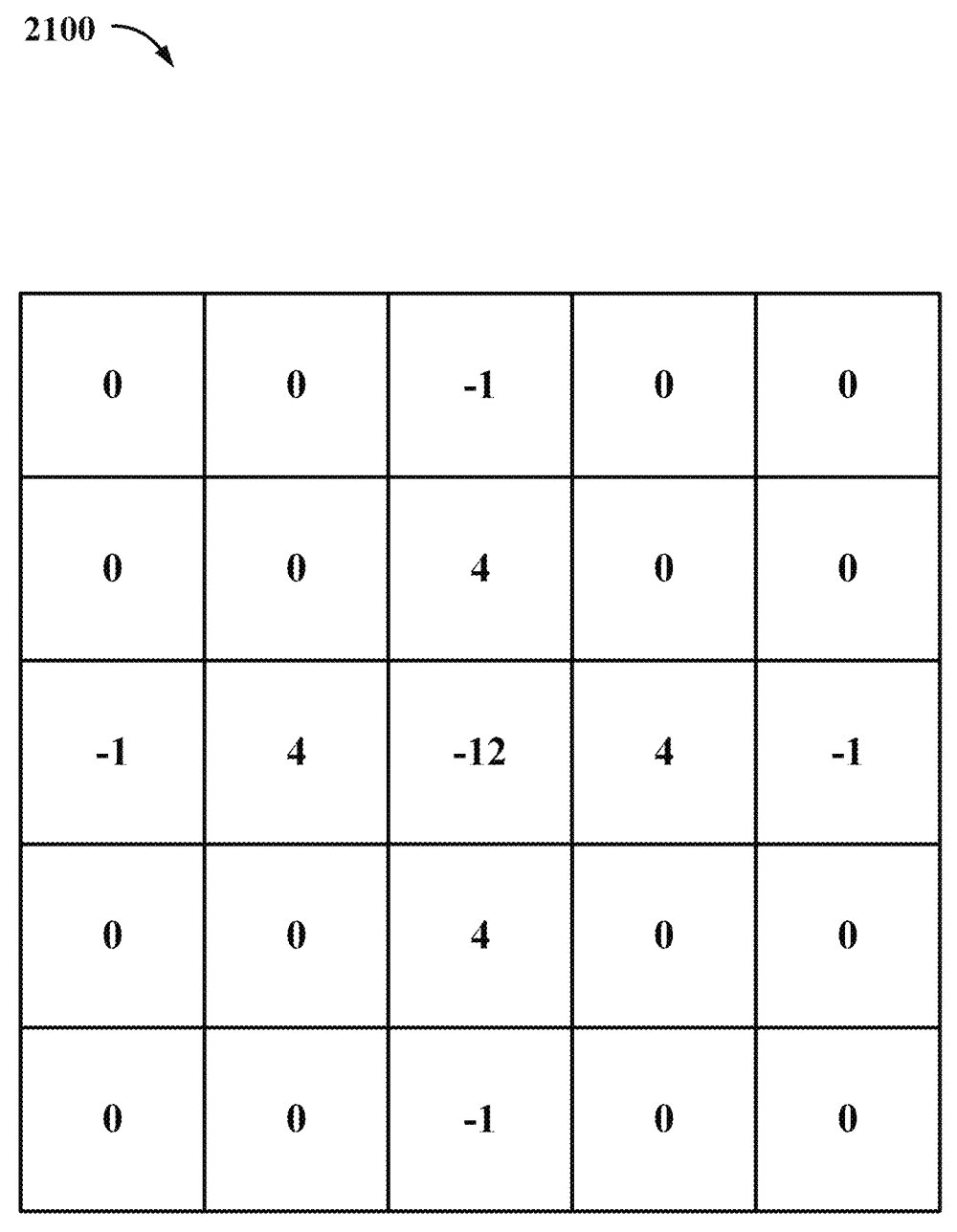

FIG. 21 illustrates an example matrix for the GMRF prior image model in evaluating the resampler.

DETAILED DESCRIPTION

Figure 6:
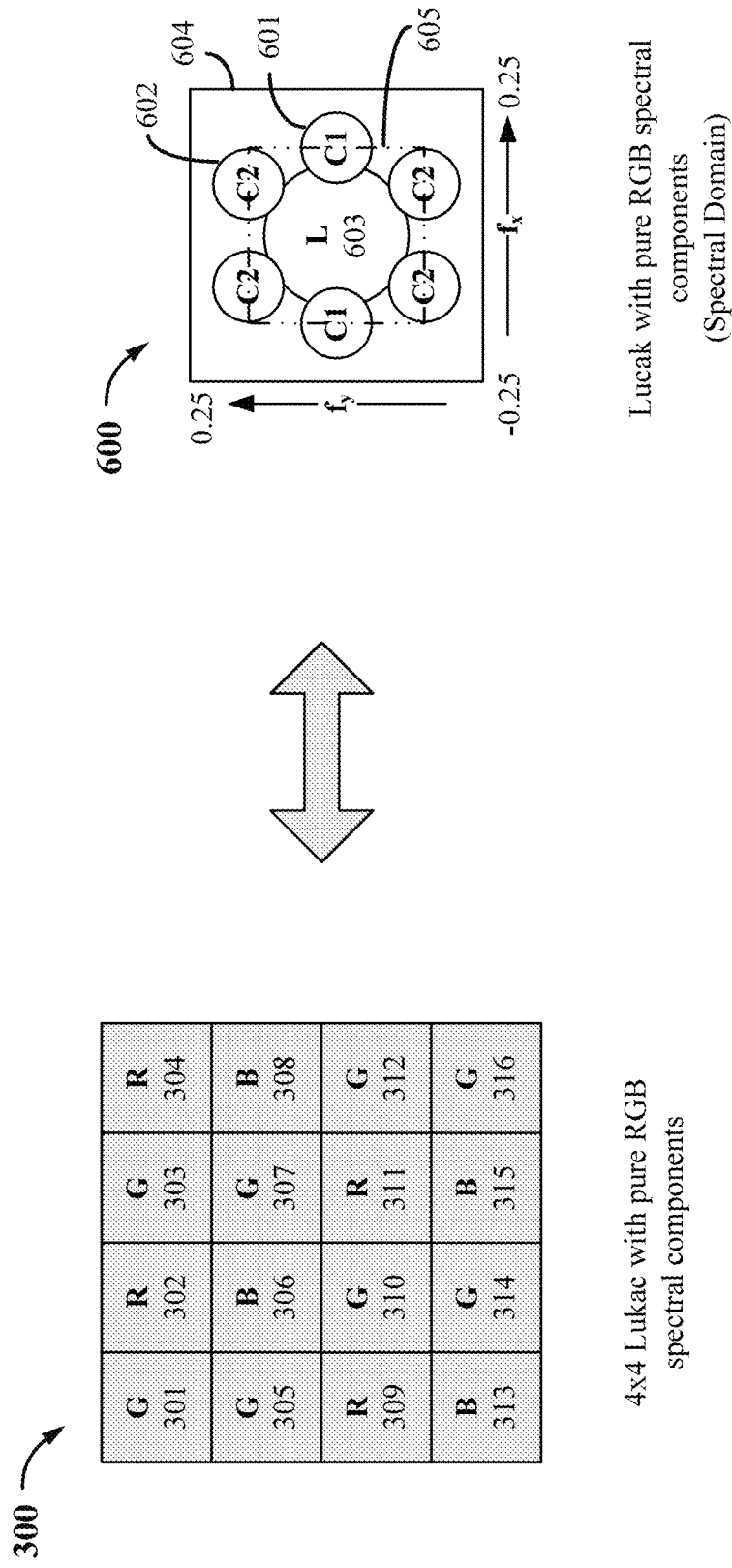
FIG. 6 illustrates an example of a Fourier spectrum representation of FIG. 3.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

Although the examples, systems, and methods described herein are described with respect to digital camera technologies, they may be implemented in other imaging technology as well. The systems and methods described herein may be implemented on a variety of different photosensitive devices, or image sensors. These include general purpose or special purpose image sensors, environments, or configurations. Examples of photosensitive devices, environments, and configurations that may be suitable for use with the invention include, but are not limited to, semiconductor charge-coupled devices (CCD) or active sensor elements in CMOS or N-Type metal-oxide-semiconductor (NMOS) technologies, all of which can be germane in a variety of applications including, but not limited to digital cameras, hand-held or laptop devices, and mobile devices (e.g., phones, smart phones, Personal Data Assistants (PDAs), Ultra Mobile Personal Computers (UMPCs), and Mobile Internet Devices (MIDs)).

The Bayer pattern is no longer the only pattern being used in the imaging sensor industry. Multiple CFA patterns have recently gained popularity because of their superior spectral-compression performance, improved signal-to-noise ratio, or ability to provide HDR imaging.

Alternative CFA designs that require modified demosaicing algorithms are becoming more ubiquitous. New CFA configurations have gained popularity due to (1) consumer demand for smaller sensor elements, and (2) advanced image sensor configurations. The new CFA configurations include color filter arrangements that break from the standard Bayer configuration and use colors of a spectrum beyond the traditional Bayer RGB spectrum, white sensor elements, or new color filter sizes. For instance, new color filter arrangements may expose sensor elements to a greater range of light wavelengths than the typical Bayer RGB configuration, and may include RGB as well as cyan, yellow, and white wavelengths (RGBCYW). Such arrangements may be included in image sensors with sensor elements of a uniform size. Other arrangements may include a pattern of different sized sensor elements, and thus, different sized color filters. Furthermore, industry demand for smaller sensor elements is creating an incentive to vary the standard 1:1 color filter to sensor element ratio, resulting in color filters that may overlap a plurality of sensor elements.

Non-Bayer CFA sensors may have superior compression of spectral energy, ability to deliver improved signal-to-noise ratio for low-light imaging, or ability to provide high dynamic range (HDR) imaging. A bottleneck to the adaption of emerging non-Bayer CFA sensors is the unavailability of efficient and high-quality color-interpolation algorithms that can demosaic the new patterns. Designing a new demosaic algorithm for every proposed CFA pattern is a challenge.

Modern image sensors may also produce raw images that cannot be demosaiced by conventional means. For instance, High Dynamic Range (HDR) image sensors create a greater dynamic range of luminosity than is possible with standard digital imaging or photographic techniques. These image sensors have a greater dynamic range capability within the sensor elements themselves. Such sensor elements are intrinsically non-linear such that the sensor element represents a wide dynamic range of a scene via non-linear compression of the scene into a smaller dynamic range.

Disclosed herein are methods and systems that provide interpolation and classification filters that can be dynamically configured to demosaic raw data acquired from a variety of color filter array sensors. The set of interpolation and classification filters are tailored to one or more given color filter arrays. In some implementations, the color filters can be pure RGB or include linear combinations of the R, G, and B filters.

Other systems and methods of color filter array resampling using non-iterative maximum a-posteriori (MAP) restoration are also disclosed. Non-Bayer color filter array (CFA) sensors may have superior compression of spectral energy, ability to deliver improved signal-to-noise ratio, or ability to provide high dynamic range (HDR) imaging. While demosaicing methods that perform color interpolation of Bayer CFA data have been widely investigated, there needs to be available efficient color-interpolation algorithms that can demosaic the new patterns to facilitate the adaption of emerging non-Bayer CFA sensors. To address this issue, in some embodiments a CFA resampler may be implemented that takes as input an arbitrary periodic CFA pattern and outputs the RGB-CFA Bayer pattern. The color filters constituting the CFA pattern can be assumed to be linear combinations of the primary RGB color filters. In some embodiments, a CFA resampler can extend the capability of a Bayer ISP to process a non-Bayer CFA image by first resampling the raw data to a Bayer grid and then using the conventional processing pipeline to generate full resolution output RGB image. In some embodiments, the forward process of mosaicking may be modeled as a linear operation. Quadratic data formatting may be used and image prior terms in a MAP framework, and the resampling matrix that linearly maps the input non-Bayer CFA raw data to Bayer CFA pattern pre-computed. The resampling matrix has a block circulant structure with circulant blocks (BCCB), allowing for computationally-efficient MAP estimation through non-iterative filtering.

The word "exemplary" is used herein to mean "serving as an example, instance, or illustration." Any embodiment described herein as "exemplary" is not necessarily to be construed as preferred or advantageous over other embodiments.

The term "direct integration" may include a power or data connection between two or more components (e.g., a processor and an image sensor) over a wired or wireless connection where the two components transfer and/or receive data in a direct link.

The term "indirect connection" may include a power or data connection over an intermediary device or devices between two or more components (e.g., a processor and an image sensor), or a device that may configure the components, the components having no direct connection to each other.

The term "substantially" is used herein to indicate within 10% of the measurement expressed, unless otherwise stated.

The words "color filter array," "filter array," and "filter element" are broad terms and are used herein to mean any form of filtering technology associated with filtering spectrums of electromagnetic radiation, including visible and non-visible wavelengths of light.

The term "color filter array" or CFA may be referred to as a "filter array," "color filters," "RGB filters," or "electromagnetic radiation filter array." When a filter is referred to as a red filter, a blue filter, or a green filter, such filters are configured to allow light to pass through that has one or more wavelengths associated with the color red, blue, or green, respectively.

The term "respective" is used herein to mean the corresponding apparatus associated with the subject. When a filter is referenced to a certain color (e.g., a red filter, a blue filter, a green filter) such terminology refers to a filter configured to allow the spectrum of that color of light to pass through (e.g., wavelengths of light that are generally associated with that color).

FIG. 1 illustrates a first example configuration of a traditional 2×2 Bayer CFA pattern 100 using a standard 1:1 size ratio of RGB color filter to sensor element. The CFA pattern 100 is a square made up of four smaller squares 101-104, wherein each of the four smaller squares 101-104 is representative of both an individual sensor element and an individual color filter. A first sensor element 101 is labeled with the letter "G" signifying a green color filter overlaying the first sensor element 101. A second sensor element 102 is labeled with an "R" signifying a red color filter overlaying the second sensor element 102. A third sensor element 103 labeled with the letter "B" signifying a blue color filter overlaying the third sensor element 103. A fourth sensor element 104 labeled again with the letter "G" signifying the green color overlaying the fourth sensor element 104.

Image sensor configuration 100 includes color filter elements that have length and width dimensions that are substantially equal to the length and width dimensions of the sensor elements (101, 102, 103, 104).

FIG. 2 illustrates a second example configuration 200 of a 3×3 sensor element array 205 with a Bayer color filter configuration. The Bayer color filter configuration 200 includes Bayer color filter elements that are 1.5 times the sensor element size. The configuration 200 is composed of nine smaller squares outlined with dashed lines, the smaller squares representing sensor elements in a 3×3 configuration. Overlaying the 3×3 sensor element array 205 is a 2×2 pattern of larger squares made up of solid lines, each larger square representing a color filter element and labeled with an alphabetical letter. The first filter element 201 labeled "G" allows a spectrum of green light to pass. The second filter element 202 labeled "R" allows a spectrum of red light to pass. A third filter element 203 labeled "B" allows a spectrum of blue light to pass. A fourth filter element 204 labeled "G" allows a spectrum of green light to pass.

The filter elements in configuration 200 may have a length and width dimension that is 1.5× greater than the corresponding length and width dimension of the sensor element, thus providing a broader spectral range than the 2×2 Bayer CFA pattern 100.

FIG. 3 illustrates a third example configuration 300 of a 4×4 sensor element array with a Lukac pattern using the standard 1:1 size ratio of RGB color filter to sensor element. The configuration 300 includes up of sixteen sensor elements 301-316, organized in a 4×4 configuration. Elements 301-316 are labeled with "G", "R", or "B", indicating they are overlaid with green, red, or blue color filters respectively.

The example configurations of FIGS. 1, 2, and 3 may each be described as a period of filter elements. The periodic arrangement of filter elements represents an irreducible minimum pattern that may be duplicated a number of times and overlaid upon an image sensor array to create a CFA for use with (and/or incorporated with) an image sensor. The periodic arrangement of filter elements may comprise one or more filter elements, each filter element having configured to allow a wavelength, or a range of wavelengths, of light pass through the filter element.

Information of an image sensor configuration may include a size of each filter element in the CFA, periodicity of filter elements, the size of each filter element, and/or the size of each sensor element. Each filter element can be defined as having a length dimension and a width dimension. A corresponding sensor element or sensor elements) may have a substantially identical width and length dimension, or different dimensions. Additionally, an image sensor may be configured to include an array of dynamic range sensor elements, each dynamic range sensor element having an integration time where the integration time controls the effective sensitivity of the sensor elements to exposed radiation.

FIG. 4 illustrates a single plane spectral image 400 for the first example configuration of the traditional 2×2 Bayer CFA pattern 100 using the standard 1:1 size ratio of RGB color filter to sensor element, described above. The single pane spectral image 400 may also be referred to in mathematical terms as y[n] throughout this disclosure. The single plane spectral image 400 is represented by a square 406 of equal length and width. The square 406 may represent a frequency plane on a Fourier domain where the edges of the square 406 are representative of the limitations of the frequency range for the example 2×2 Bayer CFA pattern 100. The frequency range of the square has an x-axis and a y-axis property shown by the $f_x$ 404 and $f_y$ 405 arrows, respectively.

Along the four perimeter edges of the square 406 are example first and second chrominance components 401 and 402 of the single plane spectral image 400. Chrominance components 401 and 402 indicate example areas where the chrominance channels exist in the Fourier domain. A luminance component 403 indicates an example area of luminance magnitude in the Fourier domain. In this example, the chrominance components 401 402 and luminance components 403 are presented to make identification of the spectral frequency corresponding to the luminance component 403 and chrominance components (401, 402) easily visible. The single plane spectral image 400 illustrated may also be referred to as the $LC_1C_2$ domain.

The single plane spectral image 400 of FIG. 4 illustrates an example Bayer CFA spectrum produced by the 2×2 Bayer CFA pattern 100 discussed above. FIG. 4 exemplifies how the location and size of the period of color filters relative to the sensor elements that define this particular image sensor configuration 100 affect the frequency domain representation of the CFA signal of the output image 400. In this case, the frequency domain representation of the example Bayer CFA spectrum 400 comprises a luminance component 403 at the baseband frequency (e.g., (0, 0)), and a set of first chrominance components 401 and second set chrominance components 402. Here, the luminance component 403 resides in the baseband of the spatial domain at the spatial frequency (0, 0), while the C1 401 components may reside at the (0, 0.5), (0.5, 0), (0, −0.5), and (−0.5, 0) frequencies and the C2 402 components may reside at the (−0.5, 0.5), (0.5, 0.5), (0.5, −0.5), and (−0.5, −0.5) frequencies. However, FIG. 4 is just one example, and a variety of image sensor configurations may result in raw images with a variety of single plane spectral images with a variety of CFA spectrums.

FIG. 5 illustrates an example single plane spectral image 500 derived from the second example configuration 200 having the 3×3 sensor element array 205 with a Bayer color filter configuration. The single plane spectral image 500 includes a large outer square 504 containing a smaller square 505. The frequency range of the square 504 has an x-axis and a y-axis property shown by the $f_x$ 405 and $f_y$ 404 arrows, respectively. The large outer square 504 may represent a frequency plane on a Fourier domain where the edges of the square 504 are representative of the limitations of the frequency range for the example 3×3 sensor element array 205 with a Bayer color filter configuration. The smaller square 505 represents the spatial frequency range of the single plane spectral image 500 that may contain a first chrominance component 501 and a second chrominance component 502 of the single plane spectral image 500. A luminance component 503 indicates an example area of luminance magnitude in the Fourier domain. The single plane spectral image 500 illustrated may also be referred to as the $LC_1C_2$ domain.

FIG. 5 shows that the luminance component 503 occupies the baseband frequency range while the first chrominance components 501 and second chrominance components 502 are modulated at the frequency limitations of the smaller square 505. In the case of the 3×3 sensor element array 205 with Bayer configured color filters being 1.5 times the size of the sensor elements 200, the chrominance components may be located in the frequency plane at a spatial frequency range of −0.33 to 0.33. For example, the first channel chrominance components 501 may reside at (0, 0.33), (0.33, 0), (0, −0.33), and (−0.33, 0) frequencies and the second channel chrominance components 502 may reside at the (−0.33, 0.33), (0.33, 0.33), (0.33, −0.33), and (−0.33, −0.33) frequencies. It is noted that in this single plane spectral image 500 there may exist interference or crosstalk between the luminance component 503 and the chrominance components 501, 502. The crosstalk can be strongest between the luminance component 503 and the first chrominance components 501.

FIG. 6 illustrates an example of a single plane spectral image 600 for the 4×4 sensor element array 300 with a Lukac pattern using the standard 1:1 size ratio of RGB color filter to sensor element, described above. The single plane spectral image 600 is represented with a large outer square 604 containing a smaller square 605. The smaller square 605 represents a spatial frequency range of the single plane spectral image 600. Along the four perimeter edges of the square 605 are chrominance components 601 and 602 of the single plane spectral image 600. The chrominance components are organized in a hexagonal formation, and represented as two color-difference components labeled as C1 601 and C2 602. Both horizontally oriented sides, or segments of the smaller square contain two chrominance components, both labeled C2 602, with each component situated toward the ends of the segments. Both vertically oriented sides, or segments of the smaller square contain one chrominance component, each labeled C1 601, with each component situated in the middle of the segment. Situated in the middle of the smaller square is a single circle representing the luminance component 603 indicating an example area of magnitude where the luminance component 603 exists in the Fourier domain. The single plane spectral image 600 illustrated may also be referred to as the $LC_1C_2$ domain. This circle is labeled with an L. The frequency range of the square has an x-axis and a y-axis property shown by the $f_x$ 604 and $f_y$ 605 arrows, respectively.

FIG. 6 illustrates that the luminance occupies the baseband while the chrominance is modulated at the frequency limitations of the spatial frequency range of the single plane spectral image 600, represented by the smaller square. In some aspects of the configuration of the 4×4 sensor element array 300, the chrominance may be located in the frequency plane at a spatial frequency range of −0.25 to 0.25. For example, in some aspects, chrominance component C1 may be modulated at spatial frequencies (−0.25, 0) and (0, −0.25), and the second chrominance component $C_2$ may be modulated at spatial frequencies (−0.25, 0.25), (−0.25, −0.25), (0.25, −0.25), and (0.25, 0.25). The single plane spectral image 600 includes interference or crosstalk between components and the crosstalk may be strongest between the luminance 603 and the modulated chrominance components C1 and $C_2$.

Figure 7:
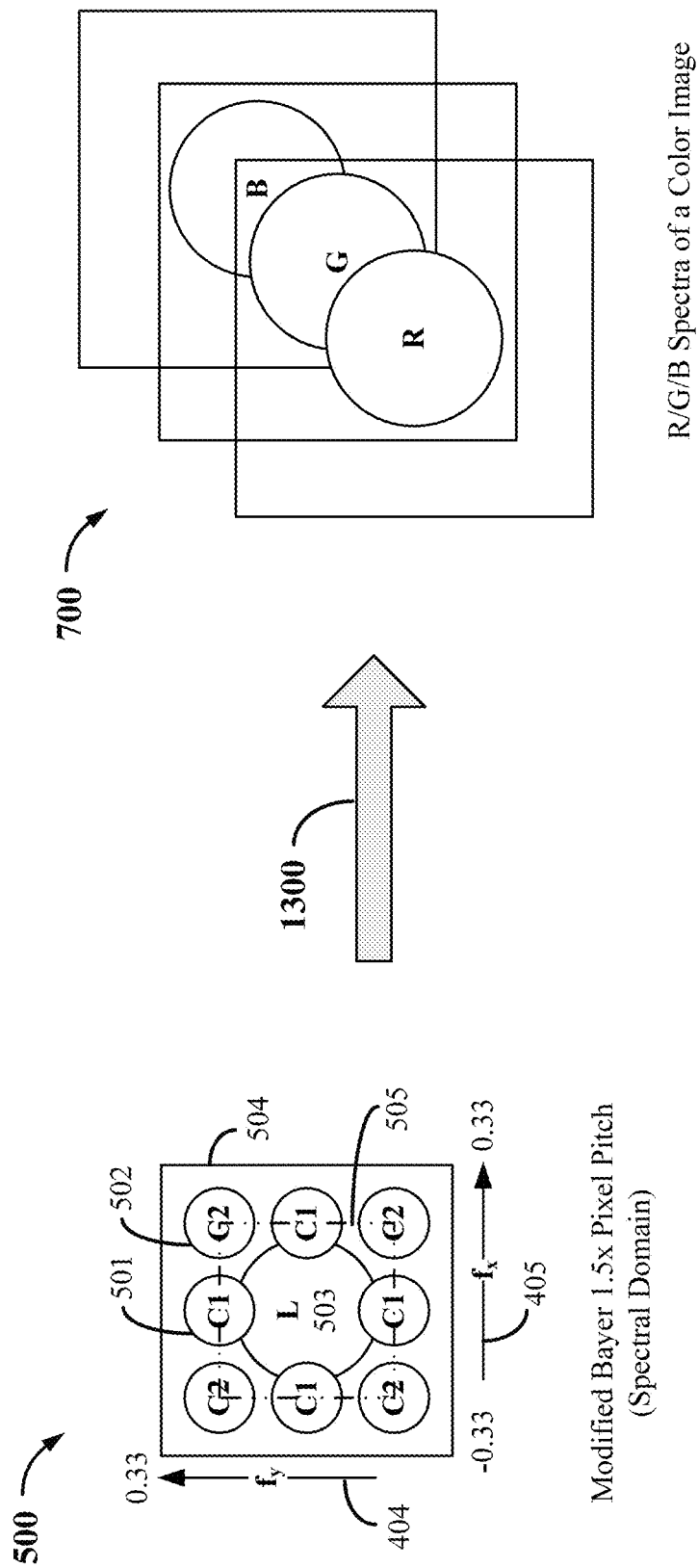
FIG. 7 illustrates an example of a Fourier spectrum representation of FIG. 2 and an example resulting product of a demosaicing process.

FIG. 7 illustrates demosaicing of the single plane spectral image 500. In this example, the single plane spectral image 500 is processed by a method 1300, discussed with reference to FIG. 13A below, to produce a triple plane RGB image 700. The demosaiced image 700 that results from demosaic method 1300 may include a triple plane RGB image 700, but this example should not be seen as limiting. The resulting demosaiced image may be any color model (e.g., CMYK) and may exist in a plurality of spectral planes, or a single plane.

Further to the example in FIG. 7, the demosaic method 1300 generally uses an image sensor configuration defined by a period of a CFA pattern to convert the data points corresponding to the chrominance components 401, 402 and luminance component 403 of the single plane spectral image 400 produced by the image sensor using that[n] particular CFA pattern. Equation 1 below enables expression of the CFA pattern y in terms of the luminance component 403 and chrominance components 401, 402 $\underline{n}=[n_1, n_2]$ where $\underline{n}$ represents an address to a spatial coordinate on a two-dimensional square lattice 404 having a horizontal position ($n_1$) and a vertical position ($n_2$). Using the Bayer CFA pattern 100 as an example, a data value at point $\underline{n}$ can be represented by the following equation:

$$y[\underline{n}] = l[\underline{n}] + ((-1)^{n_1} - (-1)^{n_2})c_1[\underline{n}] + (-1)^{n_1+n_2}c_2[\underline{n}] \quad (1)$$

Where:
$y[\underline{n}]$: CFA data value at point $\underline{n}=[n_2]$,
$l[\underline{n}]$: luminance value at point $\vec{n}=[n_2]$,
$c_1[\underline{n}]$: chrominance value at point $\underline{n}=[n_2]$,
$c_2[\underline{n}]$: chrominance value at point $\underline{n}=[n_2]$.
As an example, an $LC_1C_2$ to RGB transformation of the Bayer CFA pattern 100 can be given by:

$$\begin{bmatrix} L \\ C_1 \\ C_2 \end{bmatrix} = \frac{1}{4}\begin{bmatrix} 1 & 2 & 1 \\ -1 & 0 & 1 \\ -1 & 2 & -1 \end{bmatrix}\begin{bmatrix} R \\ G \\ B \end{bmatrix}. \quad (2)$$

Where:
L: Luminance component of a single plane spectral image,
$C_1$: First color channel chrominance component of a single plane spectral image,
$C_2$: Second color channel chrominance component of a single plane spectral image, and
R, G, B: Red, Green, Blue.

Taking the Fourier transform of equation 1, the Bayer CFA pattern 100 can be represented in the spectral domain as:

$$Y(\underline{f}) = L(\underline{f}) + C_1\left(\underline{f} - \begin{bmatrix}\frac{1}{2}\\0\end{bmatrix}\right) - C_1\left(\underline{f} - \begin{bmatrix}0\\\frac{1}{2}\end{bmatrix}\right) + C_2\left(\underline{f} - \begin{bmatrix}\frac{1}{2}\\\frac{1}{2}\end{bmatrix}\right). \quad (3)$$

Thus, a spatial domain modulation function $((-1)^{n_1} - (-1)^{n_2})$ encodes the first channel chrominance component 401, C1 in a two-dimensional carrier wave with normalized frequencies (½,0) and (0,½) and another spatial-domain modulation function $(-1)^{n_1 n_2}$ encodes the second channel chrominance component 402, C2 in a two-dimensional carrier wave with the normalized frequency (½,½). Deriving the equivalent equations (1) to (3) above for an arbitrary CFA pattern is discussed below.

Figure 8:
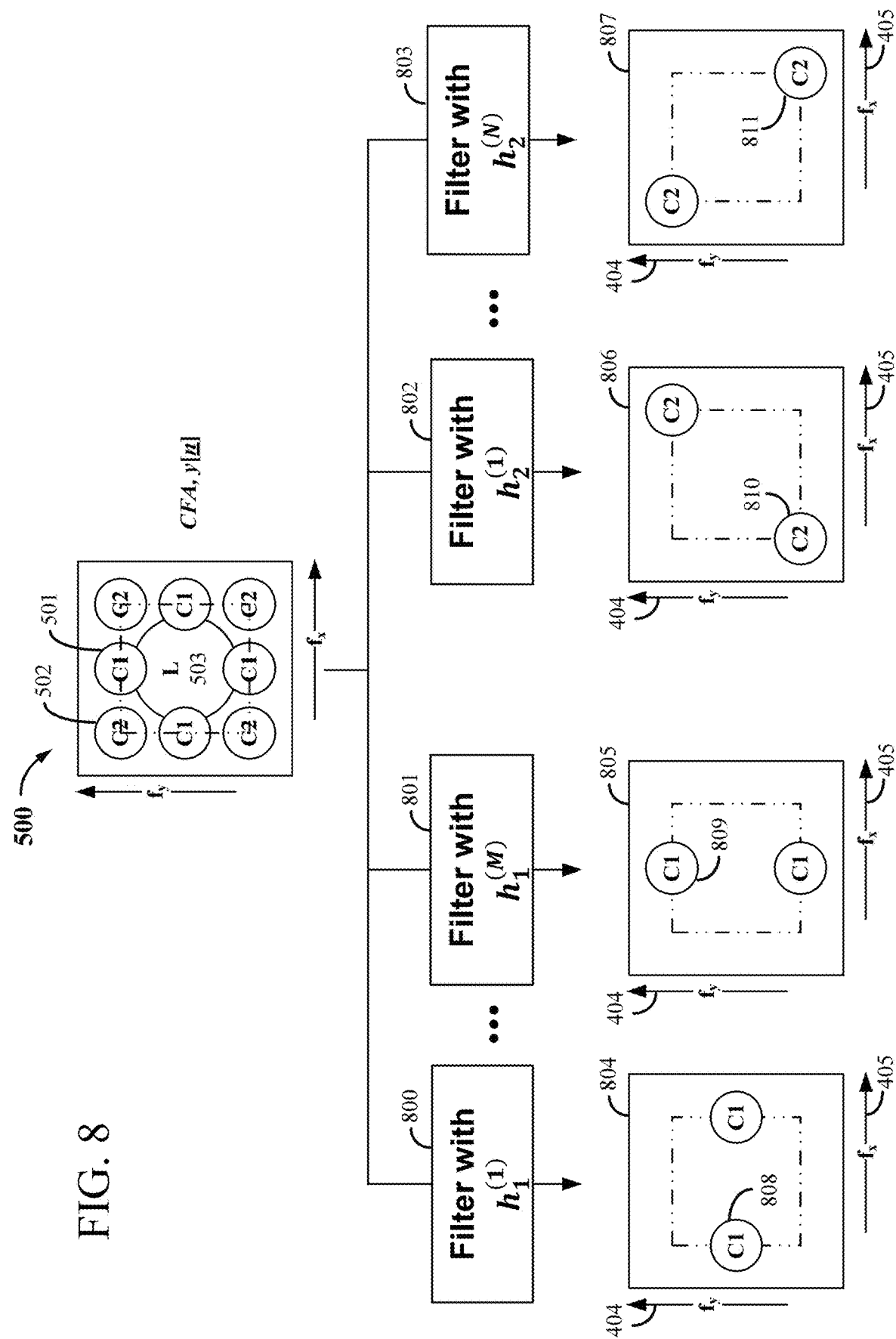
FIG. 8 illustrates a simplified example of a process for extracting chrominance components from a Fourier spectrum representation of FIG. 2.

FIG. 8 illustrates an example method for filtering a single plane spectral image 500 to extract the chrominance components 501, 502 using a filter set 800, 801, 802, 803. In this example embodiment, the filter set 800, 801, 802, 803 may be a pair of high-pass filters $h_1^\lambda[\underline{n}]$ and $h_2^\lambda[\underline{n}]$ adapted to a specific CFA pattern. To extract modulated chrominance components, $$c_{1m}^\lambda[\underline{n}] \triangleq m_{C_1}^\lambda[\underline{n}]c_1[\underline{n}] \text{ and } c_{2m}^\lambda[\underline{n}] \triangleq m_{C_2}^\lambda[\underline{n}]c_2[\underline{n}] \quad (4)$$

for each $\lambda \in \hat{\Lambda}_M^* \backslash (0,0)$ from a given CFA pattern $y[\underline{n}]$. In some aspects, the filtering equations may be $$c_{im}^\lambda[\underline{n}] = \sum_{\underline{m}} y[\underline{n}]h_i^\lambda[\underline{n} - \underline{m}], i = 1, 2. \quad (5)$$

Where:

$c_{im}^\lambda[\underline{n}]$:

extracted chrominance component at color channel i of point $\underline{n}$,
$y[\underline{n}]$: CFA data value at point $\underline{n}=[n_1, n_2]$, $h_i^\lambda[\underline{n} - \underline{m}]$:

high pass filter for point n–m, an address of a point in the Fourier domain described as a difference used to index the filter coefficient, indicative of a spatially invariant filter (i.e., a pattern consistent throughout the sensor), n: a point that neighbors point m in a first image represented in a Fourier spectrum, and m: a point in the spectral domain, an integer on a 2d grid (x,y), the 2d grid being the spectral domain of a Fourier transform.

In this example, the initial high pass filter ($h_1^{(1)}$) may filter a horizontal set of chrominance components while the proceeding filer ($h_1^{(M)}$) may filter a vertical set of chrominance components from the frequency domain.

Figure 9:
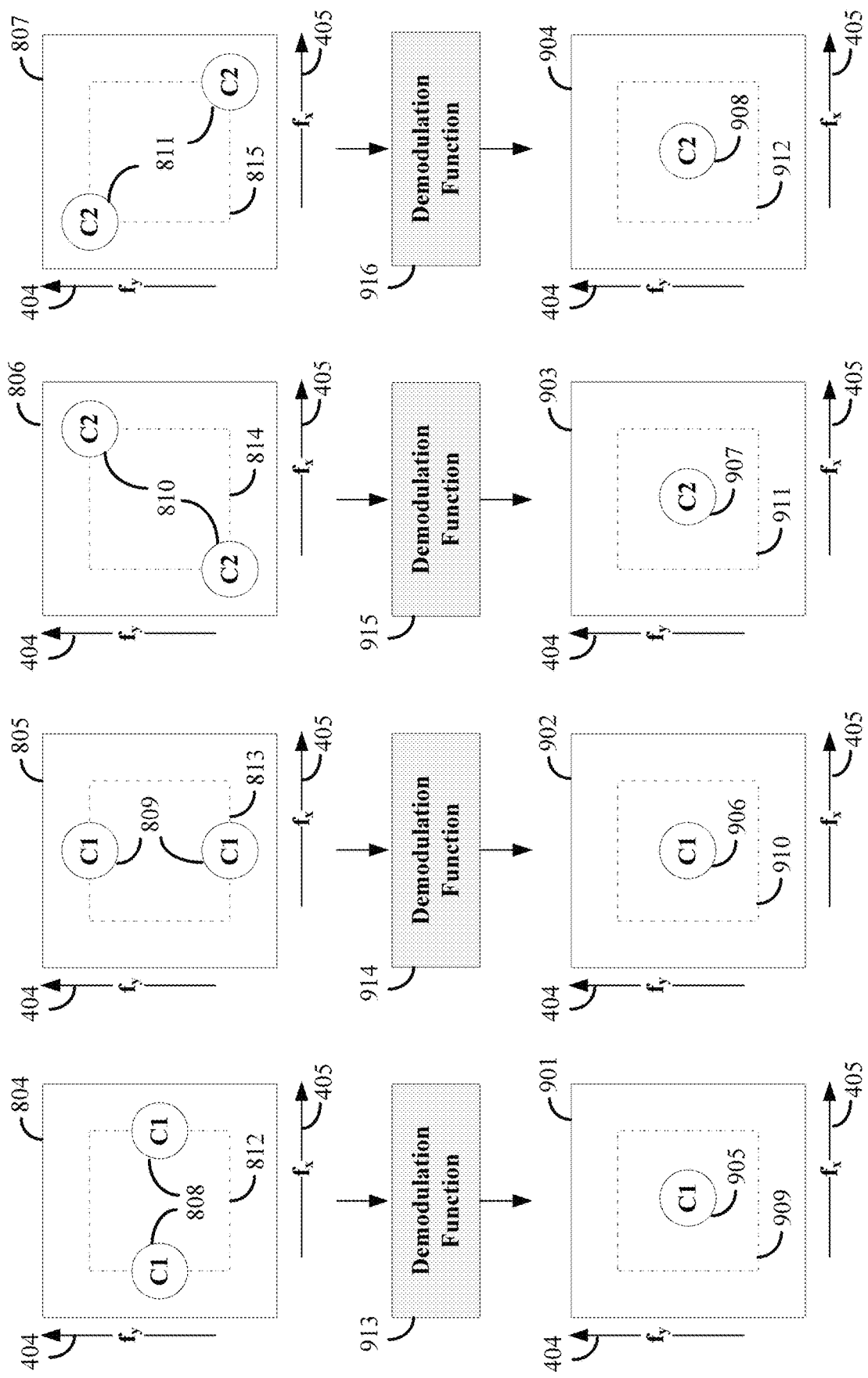
FIG. 9 illustrates a simplified example of a process for demodulating a set of chrominance components to the baseband of the Fourier spectrum.

FIG. 9 illustrates using a demodulation function to modulate the extracted chrominance components 804, 805, 806, 807 from FIG. 8 into baseband chrominance components 901, 902, 903, 904. This may be accomplished by using the analytically derived modulation functions $$m_{C_1}^\lambda[n] \text{ and } m_{C_2}^\lambda[n].$$

The demodulation operation is described by equation 6 as shown below:

$$c_i^{\bar{\lambda}}[n] = \begin{cases} \dfrac{c_{im}^{\bar{\lambda}}[n]}{m_{C_i}^\lambda[n]}, & m_{C_i}^\lambda[n] \neq 0 \\ 0 & m_{C_i}^\lambda[n] = 0 \end{cases}, i = 1, 2. \quad (6)$$

Where:

$$c_{im}^{\bar{\lambda}}[n]:$$

extracted chrominance component at point n, where the channel of the component equals i, $$m_{C_i}^\lambda[n]:$$

modulation function for a chrominance channel, the channel being equal to i.

FIG. 9 illustrates the demodulation of the chrominance components extracted using the high pass filtering derived from the modulation function into a set of baseband chrominance components. As described above, the extracted chrominance components comprise the vertical and horizontal aspects of C1, and the diagonal aspects of C2. Similar to the Fourier representation 500 in FIG. 5, the extracted chrominance components are illustrated as four squares 804, 805, 806, 807, each square a Fourier representation of an image produced by the Bayer 3×3 sensor element array 200 in FIG. 2. The four squares 804, 805, 806, 807 each contain a smaller square 812, 813, 814, 815 respectively, where the smaller square 812, 813, 814, 815 represents the spatial frequency range of the single plane spectral image 500 that may contain the chrominance components of the image. Along two of the four perimeter edges of the interior smaller square 812 of the first square 804 are two circles 808 representing the chrominance components of the single plane spectral image 500. These circles 808 represent the horizontal C1 components, the C1 components on the left and right sides of the smaller square 812. Along two of the four perimeter edges of the interior smaller square 813 of the second square 805 are circles 809 representing the chrominance components of the single plane spectral image 500. These circles 809 represent the vertical C1 components, the C1 components on the top and bottom sides of the smaller square 813. Situated upon two of the four corners of the interior smaller square 814 of the third square 806 are circles 810 representing the chrominance components of the single plane spectral image 500. These circles 810 represent the diagonal C2 components, the C2 components occupying the top right corner and the bottom left corner of the smaller square 814. Situated upon two of the four corners of the interior smaller square 815 of the fourth square 807 are circles 811 representing the chrominance components of the single plane spectral image 500. These circles 811 represent another set of diagonal C2 components, the C2 components occupying the top left corner and the bottom right corner of the smaller square 815.

FIG. 9 further illustrates the set of baseband chrominance components 901, 902, 903, 904 following demodulation of the extracted chrominance components 804, 805, 806, 807, respectively. For example, the first baseband chrominance component 905 is represented by a large square 901 that houses a smaller square 909. Following a demodulation function 913, the set of chrominance components 808 in the first set of extracted chrominance components 804 are merged into a baseband chrominance component 905. However, in contrast to the corresponding extracted chrominance components 808, the baseband chrominance component contains a single chrominance component 905 residing at the baseband frequency, and labeled as C1, referring to a first color channel chrominance component 905. Similarly, a second baseband chrominance component 906 is represented by a large square 902 that houses a smaller square 910. Following a demodulation function 914, the set of chrominance components 809 in the first set of extracted chrominance components 805 are merged into a baseband chrominance component 906. However, in contrast to the corresponding extracted chrominance components 809, the baseband chrominance component contains a single chrominance component 906 residing at the baseband frequency, and labeled as C1, referring to a first color channel chrominance component 906.

Further to FIG. 9, a third baseband chrominance component 907 is represented by a large square 903 that houses a smaller square 911. Following a demodulation function 915, the set of chrominance components 810 in the first set of extracted chrominance components 806 are merged into a baseband chrominance component 907. However, in contrast to the corresponding extracted chrominance components 810, the baseband chrominance component contains a single chrominance component 907 residing at the baseband frequency, and labeled as C2, referring to a second color channel chrominance component 907. Similarly, a fourth baseband chrominance component 908 is represented by a large square 904 that houses a smaller square 912. Following a demodulation function 916, the set of chrominance components 811 in the first set of extracted chrominance components 807 are merged into a baseband chrominance component 908. However, in contrast to the corresponding extracted chrominance components 811, the baseband chrominance component contains a single chrominance component 908 residing at the baseband frequency, and labeled as C2, referring to a second color channel chrominance component 908.

Figure 10:
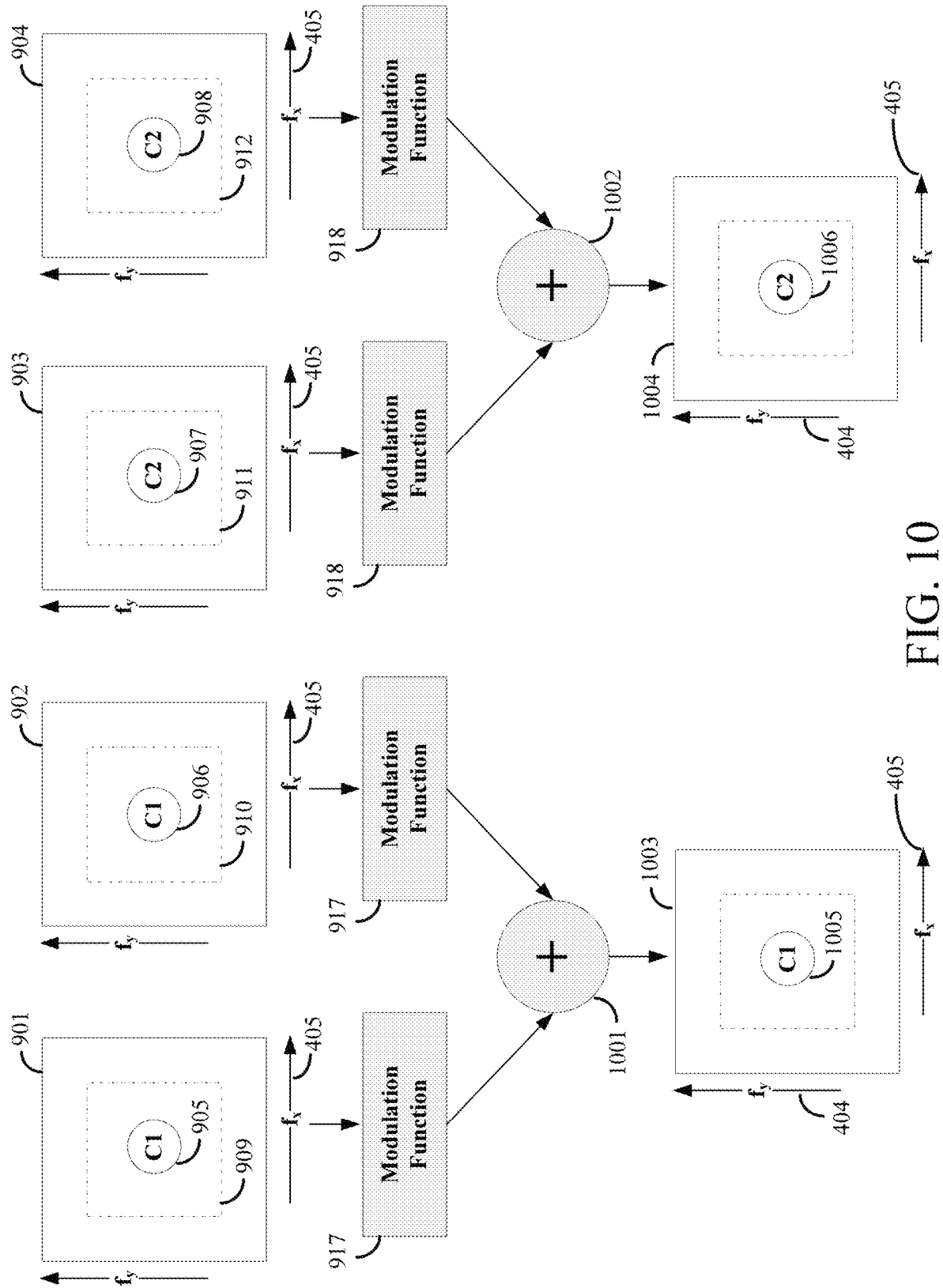
FIG. 10 illustrates a simplified example of a first step for modulating a set of baseband chrominance components to acquire a set of associated carrier frequencies.

FIG. 10 illustrates an example modulation 917, 918 to merge the multiple baseband chrominance components 905, 906, 907, 908 into a single baseband chrominance component 1005, 1006 for each one of two color channels. FIG. 10 includes the set of a first baseband chrominance component 905, a second baseband chrominance component 906, a third baseband chrominance component 907, and a fourth baseband chrominance component 908 described above with respect to FIG. 9, and also includes a set of modulation functions. The baseband chrominance components of the first color channel 905, 906 may be modulated by the same modulation function, or alternatively, may be modulated using a separate set of modulation functions based on a different set of frequencies or coefficients according to the image sensor configuration. In this example, the modulation functions for the first color channel 917 are identical, as well as the modulation functions for the second color channel 918. FIG. 10 also includes two instances of a circle with a plus sign (+) in the middle indicating a function of summation of the modulated components from the first color channel, and summation of the modulated components of the second color channel. As a result of a first summation 1001 of first channel baseband chrominance components 905, 906, a first channel chrominance carrier frequency 1005 may be generated. Similarly, as a result of a second summation 1002 of second channel baseband chrominance components 907, 908, a second channel chrominance carrier frequency 1006 may be generated. The baseband signals may be expressed with the following equation:

$$\widehat{c_{im}}[\underline{n}] = \sum_{\lambda \in \hat{\Lambda}_M^* \setminus (0,0)} \widehat{c_i}[\underline{n}], m_{C_i}^{\lambda}[\underline{n}], i = 1, 2 \qquad (7)$$

Where:

$\widehat{c_{im}}[\underline{n}]$: the modulated baseband chrominance signal for each color channel of the chrominance components, $\widehat{c_i}[\underline{n}]$: the baseband chrominance signal for each color channel of the chrominance components, $m_{C_i}^{\lambda}[\underline{n}]$:

the modulation function representative of the period of the CFA pattern.

Figure 11:
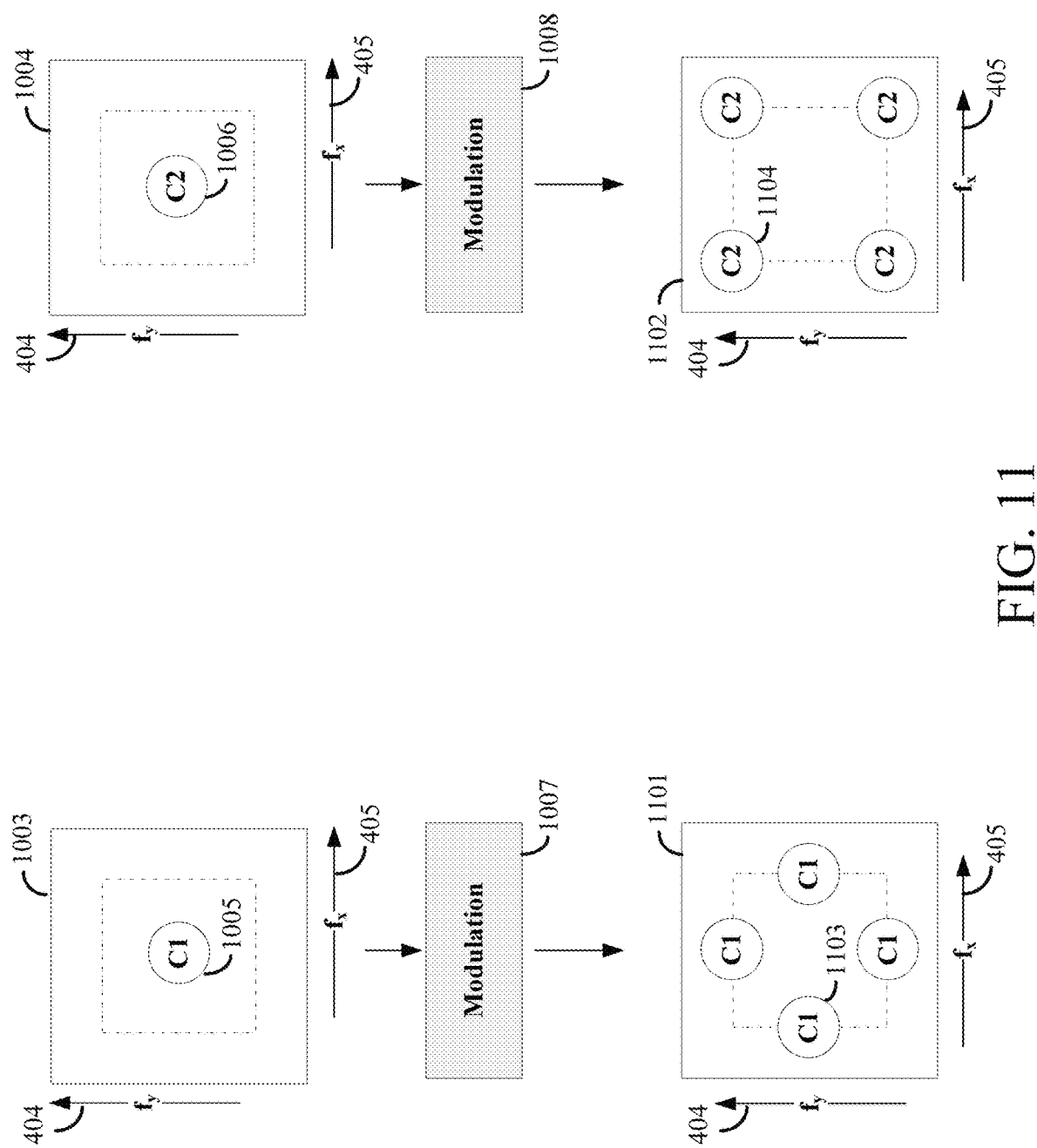
FIG. 11 illustrates a simplified example of a second step for modulating a set of baseband chrominance components to acquire a set of associated carrier frequencies.

FIG. 11 illustrates the two chrominance carrier frequencies for the first color channel 1005 and the second color channel 1006 described above, as well as a modulation function 1007 for the first color channel chrominance component and a modulation function 1008 for the second color channel chrominance component. The first color channel chrominance component 1005 may be modulated to create the full first channel chrominance component 1101. Similarly, the second color channel chrominance component 1006 may be modulated to create the full second channel chrominance component 1102.

Figure 12:
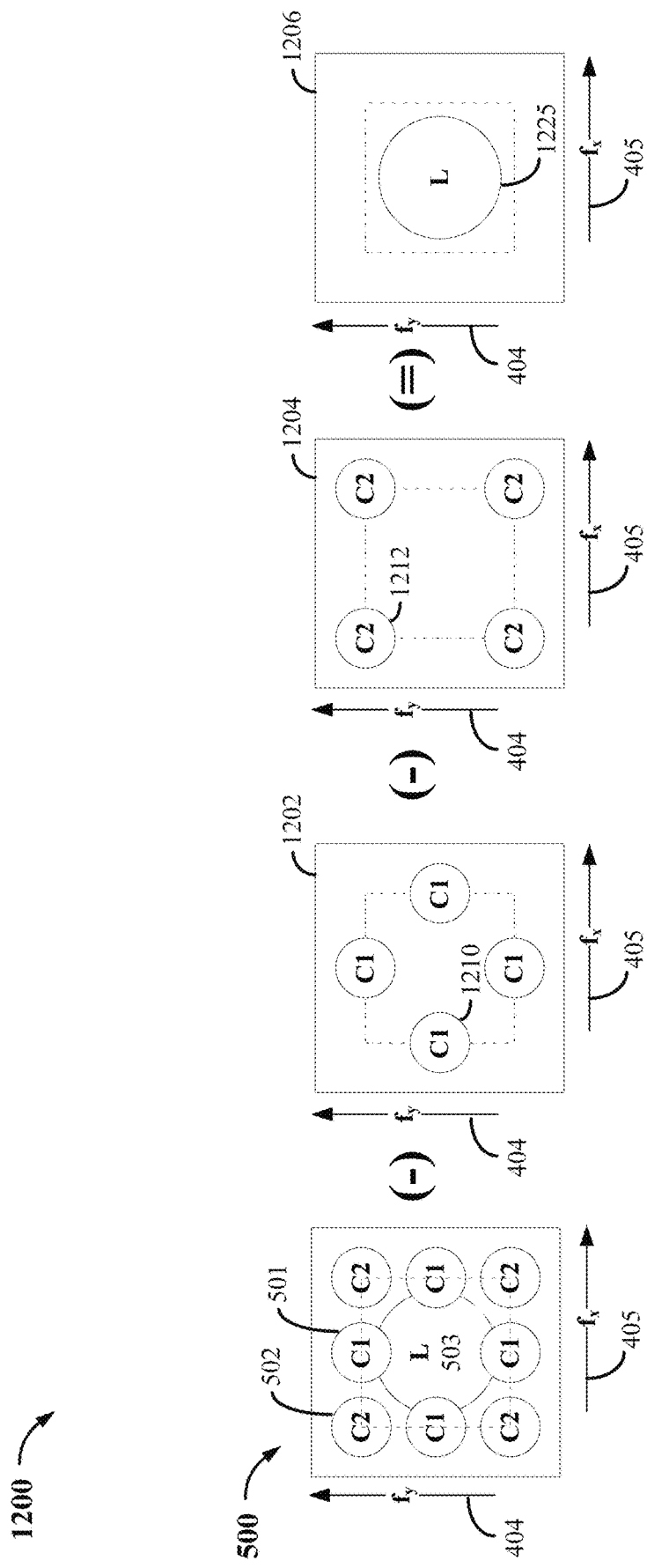
FIG. 12 illustrates a simplified process of estimating the luminance channel in the Fourier spectrum.

FIG. 12 schematically illustrates an example extraction process 1200 that extracts the luminance component 503 from the single plane spectral image 500 produced by the 3×3 Bayer pattern 200 illustrated in FIG. 2. In a first part 1202 of the extraction process 1200, a first chrominance component 1210 is extracted from the single plane spectral image 500. In a second part 1204 of the extraction process 1200, a second chrominance component 1212 is extracted from the single plane spectral image 500.

Block 1206 includes a baseband luminance component 1225 for the full-channel image which may be estimated using the following equation:

$$l[\underline{n}] = y[\underline{n}] - \widehat{c_{1m}}[\underline{n}] - \widehat{c_{2m}}[\underline{n}]. \qquad (8)$$

Where:

$\widehat{c_{1m}}[\underline{n}]$: the modulated baseband chrominance signal 1210 for the first color channel of the chrominance components, $\widehat{c_{2m}}[\underline{n}]$: the baseband chrominance signal 1210 for the second color channel of the chrominance components, $l[\underline{n}]$: the estimated baseband luminance component 1225.

FIG. 13A illustrates a flowchart of an example of a process 1300 for converting image data generated by an image sensor into a second image. In some aspects, the image data may comprise any of the images 100, 200, or 300 discussed above. In some aspects, the image data may be any single plane image, with any configuration of image sensor elements and overlying color filters. In some aspects, the image data may be just a portion of a complete image, such as a portion of images 100, 200, or 300 discussed above.

As discussed above, the Bayer pattern is no longer the dominant color filter array (CFA) pattern in the sensor industry. Multiple color filter array (CFA) patterns have gained popularity, including 1) color filter arrangements e.g. white pixel sensors, Lucas, PanChromatic, etc.; (2) color filter size based, e.g. configurations including a color filter that is 2× the pixel size, configurations including color filters that are 1.5× pixel size, etc.; and (3) exposure based high dynamic range (HDR) sensors. Process 1300 provides a hardware-friendly universal demosaic process that can demosaic data obtained from virtually any color filter array pattern.

Given an arbitrary CFA pattern, process 1300 may first determine a spectrum of the CFA image. The CFA spectrum demonstrates that mosaicking operation is, essentially a frequency modulation operation. In some aspects, a luminance component of the image resides at baseband while chrominance components of the image are modulated at high frequencies. After the CFA spectrum is derived, process 1300 may derive modulating carrier frequencies and modulating coefficients that may characterize a forward mosaicking operation. Given the modulating carrier frequencies and coefficients, process 1300 may then derive one or more of spatial-domain directional filters, spatial-domain modulation functions, and spatial-domain demodulation functions for performing a demosaic operation.

In some aspects, process 1300 may be implemented by instructions that configure an electronic hardware processor to perform one or more of the functions described below. For example, in some aspects, process 1300 may be implemented by the device 1600, discussed below with respect to FIG. 14. Note that while process 1300 is described below as a series of blocks in a particular order, one of skill in the art would recognize that in some aspects, one or more of the blocks describes below may be omitted, and/or the relative order of execution of two or more of the blocks may be different than that described below.

Block 1305 receives information indicating a configuration of sensor elements of an image sensor and a configuration of filters for the sensor elements. For example, the information received in block 1305 may indicate the image sensor configuration is any one of configurations 100, 200, 300 discussed above. The image sensor configuration may alternatively be any other sensor configuration. In some implementations, the image sensor configuration may comprise an array of sensor elements, each sensor element having a surface for receiving radiation, and each sensor element being configured to generate the image data based on radiation that is incident on the sensor element. The image sensor configuration may include a CFA pattern that includes an array of filter elements disposed adjacent to the array of sensor elements to filter radiation propagating towards sensor elements in the array of sensor elements.

In some aspects, the image sensor configuration may be dynamically derived in block 1305. In some embodiments, the image sensor configuration may be determined using information defining the CFA pattern (e.g., arrangement of the CFA, periodicity of a filter element in a repeated pattern of the CFA, a length dimension of a filter element, a width dimension of a filter element) corresponding to the array of sensor elements. In one exemplary embodiment, determining an image sensor configuration may include a processor configured to receive information from which a hardware configuration of the image sensor (including the CFA) is determined. In some examples, a processor may receive information indicative of an image sensor hardware configuration and determine the hardware information by accessing a look-up table or other stored information using the received information. In some exemplary embodiments, the image sensor may send configuration data to the processor. In still another exemplary embodiments, one or more parameters defining the image sensor configuration may be hard coded or predetermined and dynamically read (or accessed) from a storage location by an electronic processor performing process 1300.

Block 1310 generates a modulation function based on an image sensor configuration, which includes at least the information indicating the configuration of sensor elements of the image sensor and the configuration of filters for the sensor elements. The variety of example image sensor configurations discussed above may allow generation of a set of sub-lattice parameters unique to a particular one image sensor configuration. The sub-lattice parameters of a given image sensor configuration are a set of properties of the image sensor, and one or more of the set of properties may be used to generate an associated modulation function for the image sensor configuration. In some aspects, the sub-lattice parameters may be used to generate one or more modulation frequencies and/or a set of modulation coefficients. One or more of these generated components may be used to demosaic raw image data output by the particular image sensor. The sub-lattice parameters may be made up of one or more of the following components:

Let the symbol $\Psi$ represent the spectral components of the CFA pattern. This may be a range of wavelengths the sensor element is exposed to, and can be directly associated with the filter element or the plurality of filter elements that overlay each sensor element in a period of a CFA pattern.

Let $(\{B_S\}_{S \in \Psi})$ represent coset vectors associated with a period of a CFA pattern. For example, the traditional 2×2 Bayer pattern 100 of FIG. 1 has 4 unique addresses (e.g., four sensor elements) in a CFA period where each address characterized as a location having a horizontal property and a vertical property. For example, the 2×2 pattern may be associated with a two-dimensional Cartesian coordinate system where the bottom left sensor element 103 of the 2×2 pattern corresponds with the origin, or address (0, 0). The bottom left sensor element 103 being associated with a green filter element, the coset vector at that particular sensor element would provide $B_G=\{(0,0)\}$. The sensor element 102 directly above the bottom left image sensor 103, being exposed to red wavelength would then correspond to address (0, 1), resulting in coset vector $B_R=\{(0,1)\}$. The sensor element 104 directly to the right of the bottom left sensor element 103, being exposed to a blue wavelength would correspond to address (1, 0), resulting in coset vector $B_B=\{(1,0)\}$ and the sensor element 102 directly above it would correspond to address (1, 1), providing $B_G=\{(1,1)\}$. Due to the sensor element 102 also being associated with a green filter element, the coset vectors for the green spectral range would provide $B_G=\{(0,0), (1,1)\}$.

A lattice matrix, or matrix generator, represented by (M). In some aspects, the matrix generator (M) may be a diagonal representation of two addresses, $\underline{n}$ and $\underline{m}$, resulting in a 2×2 matrix. The first element of the matrix, being the number in the top left, is a number of sensor elements in one period of a CFA pattern in the x-direction of the period. For example, with a 2×2 Bayer pattern, such as pattern 100 shown in FIG. 1, the number of sensor elements in the x-direction is 2. The second element of the matrix, being the number in the bottom right, is a number of sensor elements in one period of the CFA pattern in the y-direction of the CFA pattern. Using the 2×2 Bayer pattern 100 in FIG. 1, the number of sensor elements in the y-direction is 2. The other two values in the matrix M are constant, and equal to zero (0).

Example values for the sub-lattice parameters for example image sensor configurations are as follows:

| | 2 × Bayer CFA pattern 100 | 3 × 3 Sensor Element Array 200 |
|---|---|---|
| $\Psi$ | R, G, B | R, G, B, C, Y, W |
| $\{B_S\}_{S \in \Psi}$ | $B_R = \{(0, 1)\}$, | $B_R = \{(2, 0)\}$, |
| | $B_B = \{(1, 0)\}$ | $B_B = \{(0, 2)\}$, |
| | $B_G = \{(0, 0), (1,1)\}$. | $B_W = \{(1, 1)\}$, |
| | | $B_G = \{(0, 0), (2, 2)\}$, |
| | | $B_M = \{(1, 0), (2, 1)\}$, |
| | | $B_C = \{(0, 1), (1, 2)\}$. |
| M | $\begin{bmatrix} 2 & 0 \\ 0 & 2 \end{bmatrix}$ | $\begin{bmatrix} 3 & 0 \\ 0 & 3 \end{bmatrix}$ |

The $\Psi$ component represents the spectral range of exposure to sensor elements in a period of filter elements. For example, in a traditional Bayer pattern, the spectral range is Red, Green, and Blue, and thus the spectral components $\Psi=\{R, G, B\}$. In another example, where the color filter elements are 1.5 times the sensor element size, and use the traditional Bayer spectral range (RGB), the spectral components $W=\{R, G, B, C, Y, W\}$. Since the sensor elements in the "1.5" configuration may be exposed to as many as four filter elements, there is a broader wavelength exposure to a sensor element as compared to a sensor element in a configuration where it is shielded by a single filter element of a single color.

In this example, a sensor element may be exposed to a combination of green and red wavelengths resulting in a light spectrum that can include yellow (570-590 nm wavelength). Using the same example, a sensor element may be exposed to a combination of green and blue wavelengths resulting in a light spectrum that includes the color cyan (490-520 nm wavelength). The 2×2 filter matrix of this example may also be arranged so that another sensor element is masked 25% by a filter element that passes a range of red light, 50% by filter elements that pass a range of green light, and 25% by a filter element that passes a range of blue light, thereby exposing that sensor element to a spectrum of light that is broader than the spectrum exposed to the remaining sensors. The resulting array has an effective sensor composition of 11% R, W, and B, respectively and 22% G and C, respectively, and the spectral components can be written as $\Psi=\{R, G, B, C, Y, W\}$. $\{B_S\}_{S \in \Psi}$ represents mutually exclusive sets of coset vectors associated with the spatial sampling locations of various filter elements in the period of filter elements. Lattice matrix M may be determined based on the number of filter elements in the period of filter elements and the number of pixels in the same. M may also be referred to herein as a generator matrix.

Further to block 1310, a frequency domain analysis can be done on an arbitrary CFA pattern using the Fourier transform of the particular CFA pattern. The Fourier transform of a CFA pattern is given by:

$$Y(\underline{f}) = \frac{1}{|\det(M)|} \sum_{S \in \Psi} \sum_{\underline{\lambda} \in \hat{\Lambda}_M} \sum_{\underline{b} \in B_S} e^{-j2\pi \underline{b}^T \underline{\lambda}} S(\underline{f} - \underline{\lambda}) \quad (9)$$

Where:
$Y(\underline{f})$: the frequency transform of any period of an image sensor,
M: the lattice matrix representative of a period of the image sensor,
S: spectral component that is currently being analyzed, where S is an element of $\Psi$, where $\Psi$ includes all of the spectral elements of one period of the CFA pattern,
$S(\underline{f}-\underline{\lambda})$: Fourier transform of the spectral component S in one period of the CFA pattern,
$\underline{b}^T$: transposed coset vector associated with a spectral component in one period of the CFA pattern,
$S \in \Psi$: a particular spectral component "S" present in a period of the CFA pattern,
$\underline{\lambda} \in \hat{\Lambda}_M$: $\hat{\Lambda}_M$ is a set of all modulation carrier frequencies of a given CFA period, $\underline{\lambda}$ represents a particular carrier frequency of that set,
$\underline{b} \in B_S$: $B_S$ is a set of all coset vectors associated with a spectral component in one period, $\underline{b}$ represents a particular coset vector of that set.

In equation (9) above, $\hat{\Lambda}_M$ may be referred to as the dual lattice associated with a corresponding lattice matrix M, also known as a "generator matrix," and is given by:

$$\hat{\Lambda}_M = M^{-T}\underline{m} \cap \left(-\frac{1}{2}, \frac{1}{2}\right]^2, \text{ where } \underline{m} \in \mathbb{Z}^2. \quad (10)$$

Where:
$\hat{\Lambda}_M$: set of all modulation carrier frequencies of a given CFA period,
$M^{-T}$: inverse transpose of the lattice matrix M,
$\underline{m}$: a point in the spectral domain, an integer on a 2d grid (x,y), the 2d grid being the spectral domain of a Fourier transform, and
$\underline{\lambda}$: a particular modulation frequency in the set of modulation frequencies.

Rearranging the terms in equation (9) provides the following:

$$Y(\underline{f}) = \frac{1}{|\det(M)|} \sum_{S \in \Psi} \sum_{\underline{b} \in B_S} S(\underline{f}) + \quad (11)$$

$$\sum_{\underline{\lambda} \in \hat{\Lambda}_M \backslash (0,0)} \left\{ \frac{1}{|\det(M)|} \sum_{S \in \Psi} \sum_{\underline{b} \in B_S} e^{-j2\pi \underline{b}^T \underline{\lambda}} S(\underline{f} - \underline{\lambda}) \right\}$$

Where:
$S(\underline{f})$: Fourier transform for the spectral component S in one period of the CFA pattern.

$$\frac{1}{|\det(M)|} \sum_{S \in \Psi} \sum_{\underline{b} \in B_S} S(\underline{f}))$$

The first term in equation (11), (i.e., comprises the baseband luminance component and, since $\sum_{S \in \Psi} \sum_{\underline{b} \in B_S} e^{-j2\pi \underline{b}^T \underline{\lambda}} = 0$ for $\underline{\lambda} \in \hat{\Lambda}_M \backslash (0,0)$, the second term in equation (11), (i.e., $$\sum_{\underline{\lambda} \in \hat{\Lambda}_M \backslash (0,0)} \left\{ \frac{1}{|\det(M)|} \sum_{S \in \Psi} \sum_{\underline{b} \in B_S} e^{-j2\pi \underline{b}^T \underline{\lambda}} S(\underline{f} - \underline{\lambda}) \right\}$$

represents the high-pass chrominance components modulated to frequencies $\underline{\lambda} \in \hat{\Lambda}_M \backslash (0,0)$. Each chrominance component comprises a complex weighted sum of all spectral components present in one period of the CFA, with the complex weights adding up to zero. Denoted by L and $C_{\underline{\lambda}}$, the luminance and modulated chrominance components, respectively, can be written as:

$$Y(\underline{f}) = L(\underline{f}) + \sum_{\underline{\lambda} \in \hat{\Lambda}_M \backslash (0,0)} C_{\underline{\lambda}}(\underline{f} - \underline{\lambda}). \quad (12)$$

Where:

$$C_{\underline{\lambda}}(\underline{f} - \underline{\lambda}) = \frac{1}{|\det(M)|} \sum_{S \in \Psi} \sum_{\underline{b} \in B_S} e^{-j2\pi \underline{b}^T \underline{\lambda}} S(\underline{f} - \underline{\lambda}), \text{ and} \quad (13)$$

$$L(\underline{f}) = \frac{1}{|\det(M)|} \sum_{S \in \Psi} \sum_{\underline{b} \in B_S} S(\underline{f}). \quad (14)$$

Thus, (12) allows for an arbitrary CFA pattern to be decomposed into baseband luminance and modulated chrominance components. The Fourier transform in equation (12) may be simplified as follows:

$$Y(\underline{f}) = L(\underline{f}) + \sum_{\underline{\lambda} \in \hat{\Lambda}_M \backslash (0,0)} \{s_{\underline{\lambda}} C_1(\underline{f} - \underline{\lambda}) + t_{\underline{\lambda}} C_2(\underline{f} - \underline{\lambda})\}. \quad (15)$$

A distinction between equation (12) and equation (15) is that in the latter there are two unique chrominance components, $C_1$ and $C_2$, and each chrominance component is a real-weighted sum of all spectral components, S E W, present in a period of the CFA. The modulation coefficients $s_{\underline{\lambda}}$ and $t_{\underline{\lambda}}$ are, in general, complex, with $s_{-\underline{\lambda}} = s_{\underline{\lambda}}^*$ and $t_{-\underline{\lambda}} = t_{\underline{\lambda}}^*$ whenever $\underline{\lambda}, -\underline{\lambda} \in \hat{\Lambda}_M \backslash (0,0)$.

For a given periodic CFA pattern, the lattice generator matrix M, the set of spectral filters in one period of the CFA ($\Psi$), and the sets of offset vectors associated with spectral filters $\{B_S\}_{S \in \Psi}$ can be inferred as explained above. For instance, the values of $\Psi$, $B_S$, and M for the two example CFA patterns 100 and 200 shown in FIG. 1 and FIG. 2 are defined above. Substituting the values of $\Psi$, $B_S$, and M in equation (9) and equation (10), the modulation carrier frequencies $\underline{\lambda} \in \hat{\Lambda}_M \backslash (0,0)$, the modulation coefficients $s_{\underline{\lambda}}$ and $t_{\underline{\lambda}}$, and the inherent RGB to $LC_1C_2$ 3×3 transformation for a given CFA pattern may be determined. Taking the inverse Fourier transform of equation (15) enables expression of the CFA pattern y[$\underline{n}$] in terms of the luminance and chrominance components for arbitrary CFA patterns:

$$y[\underline{n}] = l[\underline{n}] + m_{c_1}[\underline{n}] c_1[\underline{n}] + m_{c_2}[\underline{n}] c_2[\underline{n}] \quad (16)$$

Where:
l[$\underline{n}$]: Luminance component at point $\underline{n}$,
$m_{c_1}[\underline{n}]$: spatial domain modulation function for first color channel chrominance component,
$c_1[\underline{n}]$: spatial domain of a first color channel chrominance component,
$m_{c_2}[\underline{n}]$: spatial domain modulation function for second color channel chrominance component,
$c_2[\underline{n}]$: spatial domain of a second color channel chrominance component.

In equation (16), $m_{c_1}[\underline{n}]$ and $m_{c_2}[\underline{n}]$ represent spatial-domain functions that modulate the chrominance signals to high-frequency carrier waves. The modulation function for chrominance channels C1 and C2 can be given by:

$$m_{c_1}[\underline{n}] = \mathcal{F}^{-1}[\Sigma_{\underline{\lambda}\in\hat{\Lambda}_M\backslash(0,0)}\{s_{\underline{\lambda}}\delta(\underline{f}-\underline{\lambda})\}], \text{ and} \quad (17a)$$

$$m_{c_2}[\underline{n}] = \mathcal{F}^{-1}[\Sigma_{\underline{\lambda}\in\hat{\Lambda}_M\backslash(0,0)}\{t_{\underline{\lambda}}\delta(\underline{f}-\underline{\lambda})\}] \quad (17b)$$

Where:
$\mathcal{F}^{-1}$: inverse Fourier transform,
$s_{\underline{\lambda}}$: modulation coefficient for first color channel chrominance component,
$t_{\underline{\lambda}}$: modulation coefficient for second color channel chrominance component,
$\delta(\underline{f}-\underline{\lambda})$: delta represents a Dirac delta function, meaning the delta function is equal to zero when $\underline{f}-\underline{\lambda}$ is not equal to zero. Equal to infinity when $\underline{f}=\underline{\lambda}$.

Defining the set $\hat{\Lambda}_M^* = \{\underline{\lambda}\in\hat{\Lambda}_M|\lambda_1=0,\lambda_2>0\}\cup\{\underline{\lambda}\in\hat{\Lambda}_M|\lambda_1>0\}$, the equation (17a) and equation (17b) may be re-written as:

$$m_{c_1}[\underline{n}] = \mathcal{F}^{-1}[\Sigma_{\underline{\lambda}\in\hat{\Lambda}_M^*\backslash(0,0)}s_{\underline{\lambda}}\delta(\underline{f}-\underline{\lambda})+s_{-\underline{\lambda}}Y(\underline{f}+\underline{\lambda})], \text{ and} \quad (18a)$$

$$m_{c_2}[\underline{n}] = \mathcal{F}^{-1}[\Sigma_{\underline{\lambda}\in\hat{\Lambda}_M^*\backslash(0,0)}t_{\underline{\lambda}}\delta(\underline{f}-\underline{\lambda})+t_{-\underline{\lambda}}\delta(\underline{f}+\underline{\lambda})] \quad (18b)$$

Where:
$s_{-\underline{\lambda}}$: modulation coefficient for the first color channel chrominance component at the negative of the 2d vector represented by lambda,
$t_{-\underline{\lambda}}$: modulation coefficient for the second color channel chrominance component at the negative of the 2d vector represented by lambda.

As noted above, $s_{-\underline{\lambda}} = s_{\underline{\lambda}}^*$ when $-\underline{\lambda}\in\hat{\Lambda}_M\backslash(0,0)$ and equals zero otherwise. Computing the inverse Fourier transform of equation (18a) and equation (18b) provides the spatial-domain frequency-modulation function for the chrominance channel C1 and C2:

$$m_{C_1}[\underline{n}] = \sum_{\underline{\lambda}\in\hat{\Lambda}_M^*\backslash(0,0)} m_{C_1}^{\underline{\lambda}}[\underline{n}], \text{ and} \quad (19a)$$

$$m_{C_2}[\underline{n}] = \sum_{\underline{\lambda}\in\hat{\Lambda}_M^*\backslash(0,0)} m_{C_2}^{\underline{\lambda}}[\underline{n}] \quad (19b)$$

Where, $$m_{C_1}^{\underline{\lambda}}[\underline{n}] = \begin{cases} \sum_{\underline{\lambda}\in\hat{\Lambda}_M^*\backslash(0,0)} s_{\underline{\lambda}}e^{j2\pi\underline{\lambda}^T\underline{n}}, & -\underline{\lambda}\notin\hat{\Lambda}_M \\ \sum_{\underline{\lambda}\in\hat{\Lambda}_M^*\backslash(0,0)} |s_{\underline{\lambda}}|\cos(2\pi\underline{\lambda}^T\underline{n}+\varphi_{s_{\underline{\lambda}}}), & -\underline{\lambda}\in\hat{\Lambda}_M \end{cases} \quad (20a)$$

and $$m_{C_2}^{\underline{\lambda}}[\underline{n}] = \begin{cases} \sum_{\underline{\lambda}\in\hat{\Lambda}_M^*\backslash(0,0)} t_{\underline{\lambda}}e^{j2\pi\underline{\lambda}^T\underline{n}}, & -\underline{\lambda}\notin\hat{\Lambda}_M \\ \sum_{\underline{\lambda}\in\hat{\Lambda}_M^*\backslash(0,0)} |t_{\underline{\lambda}}|\cos(2\pi\underline{\lambda}^T\underline{n}+\varphi_{t_{\underline{\lambda}}}), & -\underline{\lambda}\in\hat{\Lambda}_M \end{cases} \quad (20b)$$

In equation (20a), $|s_{\underline{\lambda}}|$ and $\varphi_{\underline{\lambda}}$ respectively define the amplitude and the phase of the complex modulation coefficient $s_{\underline{\lambda}}$, where:

$$|s_{\underline{\lambda}}| = \sqrt{\text{Re}\{s_{\underline{\lambda}}\}^2 + \text{Im}\{s_{\underline{\lambda}}\}^2}, \quad \varphi_{s_{\underline{\lambda}}} = \arctan2(\text{Im}\{s_{\underline{\lambda}}\}, \text{Re}\{s_{\underline{\lambda}}\}). \quad (21)$$

Where:
Re$\{s_{\underline{\lambda}}\}$ refers to a real number portion of the modulation coefficients at a set of x y coordinates within the spatial domain of a given CFA signal in an image, and
Im$\{s_{\underline{\lambda}}\}$ refers to an imaginary portion of the modulation coefficients at the set of x y coordinates within the spatial domain of the image.

In equation (20b), $|t_{\underline{\lambda}}|$ and $\varphi_{\underline{\lambda}}$ respectively define the amplitude and the phase of the complex modulation coefficient $s_{\underline{\lambda}}$, where:

$$|t_{\underline{\lambda}}| = \sqrt{\text{Re}\{t_{\underline{\lambda}}\}^2 + \text{Im}\{t_{\underline{\lambda}}\}^2}, \quad \varphi_{t_{\underline{\lambda}}} = \arctan2(\text{Im}\{t_{\underline{\lambda}}\}, \text{Re}\{t_{\underline{\lambda}}\}). \quad (22)$$

Where:
Re$\{t_{\underline{\lambda}}\}$ refers to a real number portion of the modulation coefficients at a set of x y coordinates within the spatial domain of a given CFA signal in an image, and
$\{t_{\underline{\lambda}}\}$ refers to an imaginary portion of the modulation coefficients at the set of x y coordinates within the spatial domain of the image.

Further to block 1310, as discussed above, the modulation function is determined based on a set of modulation frequencies and the set of modulation coefficients derived as discussed above. The modulation frequencies may be described as $\hat{\Lambda}_M = M\underline{m}\cap(\underline{\lambda}\in\hat{\Lambda}_M\backslash(0,0))]^2$, where $\hat{\Lambda}_M$ is a set of modulation frequencies of a given CFA period, $\underline{m}\in\mathbb{Z}^2$ where $\mathbb{Z}^2$ is a two dimensional integer lattice of a spatial domain of the image, M is the lattice matrix determined based on the sensor configuration described above, and $\underline{\lambda}$ is equivalent to the integer lattice $\mathbb{Z}^2$.

In block 1315, image data is demodulated based on the generated modulation function to determine chrominance and luminance components of the image data. In some aspects, block 1315 may perform the functions described below with respect to process 1315 of FIG. 13B. In some aspects, the image data that is demodulated may comprise an image, for example, an image of a scene captured by the image sensor. In some aspects, the image data may comprise only a portion of an image captured by the image sensor. In some aspects, the image data comprises a single plane image.

In block 1320, a triple plane image is generated based on the determined chrominance and luminance components. As disclosed above, the single plane CFA image comprises sections of luminance and chrominance components in a spatial frequency domain. For example, FIG. 7 illustrates generation of an image based on extracted luminance component and baseband signals for each chrominance component. In some aspects of block 1320, an image other than a triple plan image may be generated. For example, in some aspects, a single plane, or double plane image may be generated instead of a triple plane image.

Figure 13B:
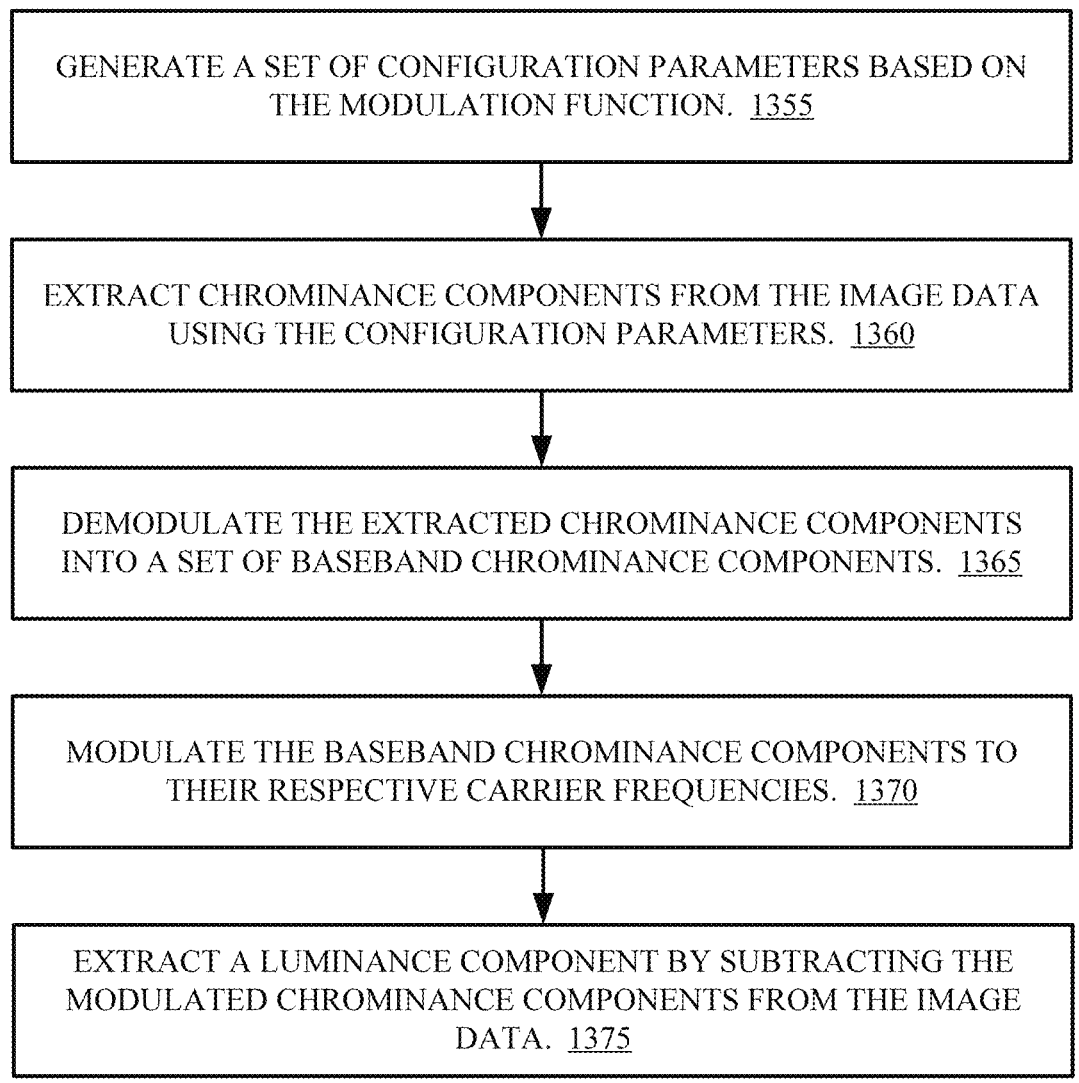
FIG. 13B is a flowchart of a method for demodulating an image.

FIG. 13B is a flowchart of one example of a process for demodulating an image. In some aspects, process 1315 of FIG. 13B may be performed by the processor 1404 of FIG. 14A or 14B. In some aspects, process 1315 may be performed by the universal demosaic 1432 of FIG. 14B.

In block 1355, a set of configuration parameters are generated based on a derived modulation function. In one example embodiment, the generated configuration parameters may include a set of high pass frequency filters configured to extract the set of chrominance components from a CFA image. In some aspects, the high pass filters may be modulated based on the configuration of the image sensor to perform the extraction. The configuration parameters may also include a set of edge detecting filters configured to determine an energy level of the image data in at least one or more of a horizontal direction, a vertical direction, and a diagonal direction. The edge detecting filters may also be configured to detect an energy level indicative of an intensity difference of radiation that is incident on neighboring sensor elements. Thus, the edge detection filters may be configured to identify points in a digital image at which the image brightness changes sharply, or has a discontinuity.

In block 1360, chrominance components from the image data are extracted based on the generated set of configuration parameters. As disclosed above, the image data comprises luminance and chrominance components in a spatial frequency domain. For example, FIG. 8 illustrates a method for filtering a single plane spectral image 500 to extract the chrominance components 501, 502 using a filter set (for example, filters 800, 801, 802, 803).

High pass filters may be used to extract modulated chrominance components from the image data. In one exemplary embodiment, a pair of high-pass filters $$h_1^\lambda[n] \text{ and } h_2^\lambda[n]$$

are designed based on the derived modulation function to extract modulated chrominance components, where $$h_1^\lambda[n]$$

may extract the C1 401, 501, 601 chrominance components resulting in a filtered product described as:

$$c_{1m}^\lambda[n] \triangleq m_{C_1}^\lambda[n]c_1[n], \tag{23a}$$

Where $$c_{1m}^\lambda[n]$$

represents the extracted C1 chrominance component, $$m_{C_1}^\lambda[n]$$

represents the modulation function, and $c_1[n]$ represents the C1 chrominance component before extraction using the filter for each $\underline{\lambda} \in \hat{\Lambda}_M^* \backslash (0,0)$ from a given CFA pattern y[n].

The extracted C2 chrominance component may be described as:

$$c_{2m}^\lambda[n] \triangleq m_{C_2}^\lambda[n]c_2[n] \tag{23b}$$

Where:

$$c_{2m}^\lambda[n]$$

represents the extracted chrominance component, $$m_{C_2}^\lambda[n]$$

represents the modulation function for the C2 component, and $c_2[n]$ represents the C2 chrominance component before extraction using the filter for each $\overline{\lambda} \in \hat{\Lambda}_M^* \backslash (0,0)$ from a given CFA pattern y[n].

The filtering equations are given by:

$$c_{im}^\lambda[n] = \sum_{\underline{m}} y[n]h_i^\lambda[n - m], \tag{24}$$

Where i=1, 2 and is representative of the set of chrominance components, and

[n] is the particular CFA pattern being analyzed, in this case, the CFA pattern of the image data.

The edge detection filters may be generated in a similar manner, by using the derived modulation function or by using a known set of edge detectors. The edge detection filters may similarly be generated using the modulation function for the image data or by using a known set of edge detectors.

In block 1365, the extracted chrominance components are demodulated into a set of baseband chrominance components. As disclosed above, the extracted chrominance components 808-811 can be demodulated using the following equation:

$$\overline{c_i^\lambda[n]} = \begin{cases} \dfrac{c_{im}^\lambda[n]}{m_{C_i}^\lambda[n]}, & m_{C_i}^\lambda[n] \neq 0 \\ 0 & m_{C_i}^\lambda[n] = 0 \end{cases}, i = 1, 2. \tag{25}$$

For example, FIG. 9 illustrates the demodulation of the chrominance components extracted using the high pass filtering derived from the modulation function into a set of baseband chrominance components.

In block 1370, the baseband chrominance components are modulated to their respective carrier frequencies. As disclosed above, the baseband chrominance signals can be multiplied with the modulation functions of luminance and chrominance components in a spatial frequency domain. For example, FIG. 11 illustrates one aspect of block 1370.

In block 1375, a luminance component is extracted from the image data based on the determined carrier frequencies. In some aspects, the modulated chrominance components are subtracted from the image data to determine the luminance component. As disclosed above, the single plane CFA image comprises sections of luminance and chrominance components in a spatial frequency domain. For example, FIG. 12 and the corresponding discussion illustrate one aspect of block 1375. In some aspects, the luminance component may be obtained by subtracting all chrominance components from the image data.

Figure 14A:
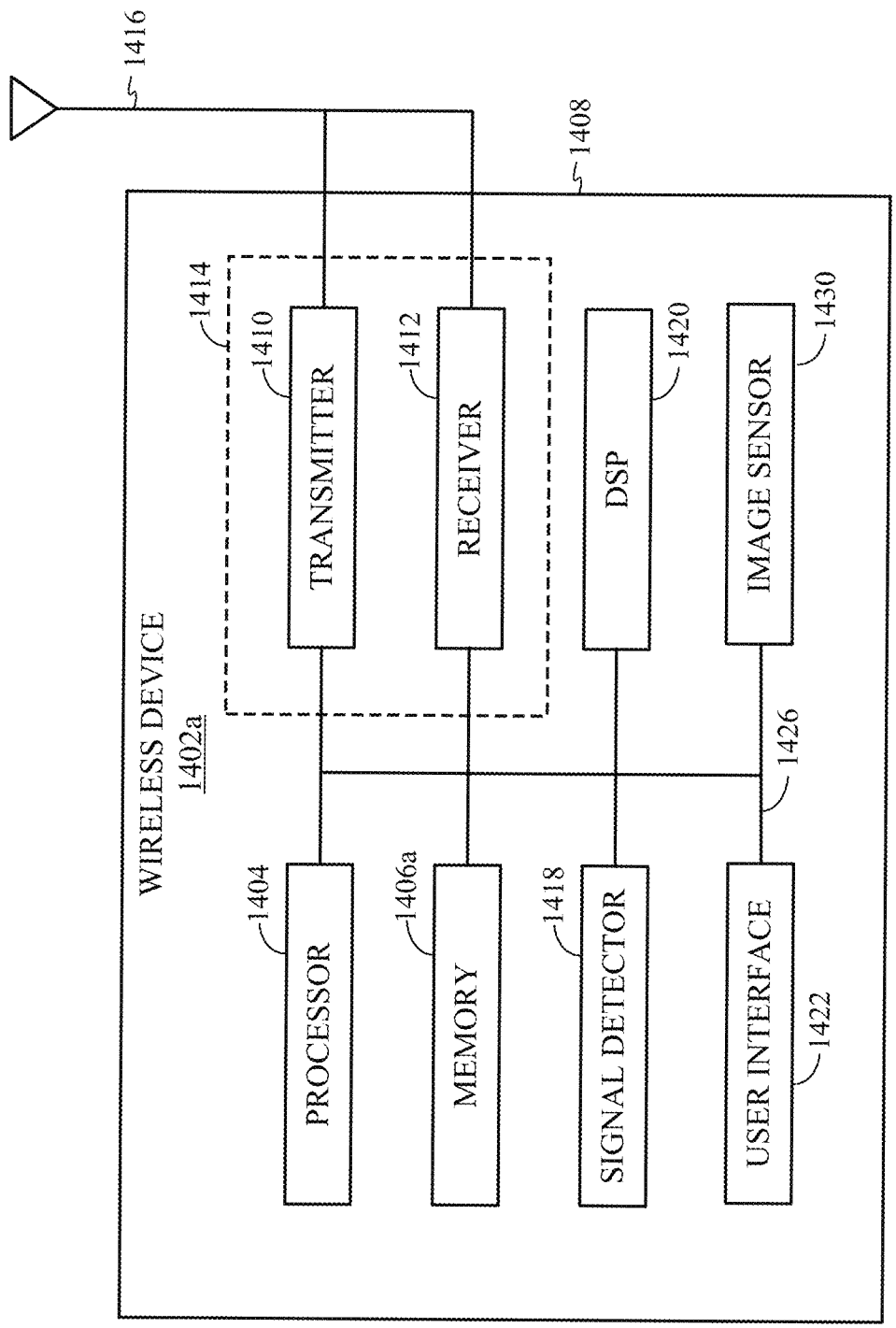
FIG. 14A illustrates an embodiment of a wireless device of one or more of the mobile devices of FIG. 1.

FIG. 14A shows an exemplary functional block diagram of a wireless device 1402a that may implement one or more of the disclosed embodiments. The wireless device 1402a may include a processor 1404 which controls operation of the wireless device 1402a. The processor 1404 may also be referred to as a central processing unit (CPU). Memory 1406a, which may include both read-only memory (ROM) and random access memory (RAM), may provide instructions and data to the processor 1404. A portion of the memory 1406a may also include non-volatile random access memory (NVRAM). The processor 1404 typically performs logical and arithmetic operations based on program instructions stored within the memory 1406a. The instructions in the memory 1406a may be executable to implement the methods described herein.

The processor 1404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1402a may also include a housing 1408 that may include a transmitter 1410 and/or a receiver 1412 to allow transmission and reception of data between the wireless device 1402a and a remote location. The transmitter 1410 and receiver 1412 may be combined into a transceiver 1414. An antenna 1416 may be attached to the housing 1408 and electrically coupled to the transceiver 1414. An image sensor 1430 may capture images and make image data available to the processor 1404. In some aspects, the image sensor 1430 may be configured to capture any one or more of the images 100, 200, or 300 discussed herein. The wireless device 1402a may also include (not shown) multiple transmitters, multiple receivers, multiple transceivers, and/or multiple antennas.

The wireless device 1402a may also include a signal detector 1418 that may be used in an effort to detect and quantify the level of signals received by the transceiver 1414. The signal detector 1418 may detect such signals as total energy, energy per subcarrier per symbol, power spectral density and other signals. The wireless device 1402a may also include a digital signal processor (DSP) 1420 for use in processing signals. The DSP 1420 may be configured to generate a packet for transmission. In some aspects, the packet may comprise a physical layer data unit (PPDU).

The wireless device 1402a may further comprise a user interface 1422 in some aspects. The user interface 1422 may comprise a keypad, a microphone, a speaker, and/or a display. The user interface 1422 may include any element or component that conveys information to a user of the wireless device 1402a and/or receives input from the user.

The various components of the wireless device 1402a may be coupled together by a bus system 1426. The bus system 1426 may include a data bus, for example, as well as a power bus, a control signal bus, and a status signal bus in addition to the data bus. Those of skill in the art will appreciate the components of the wireless device 1402a may be coupled together or accept or provide inputs to each other using some other mechanism.

Figure 14B:
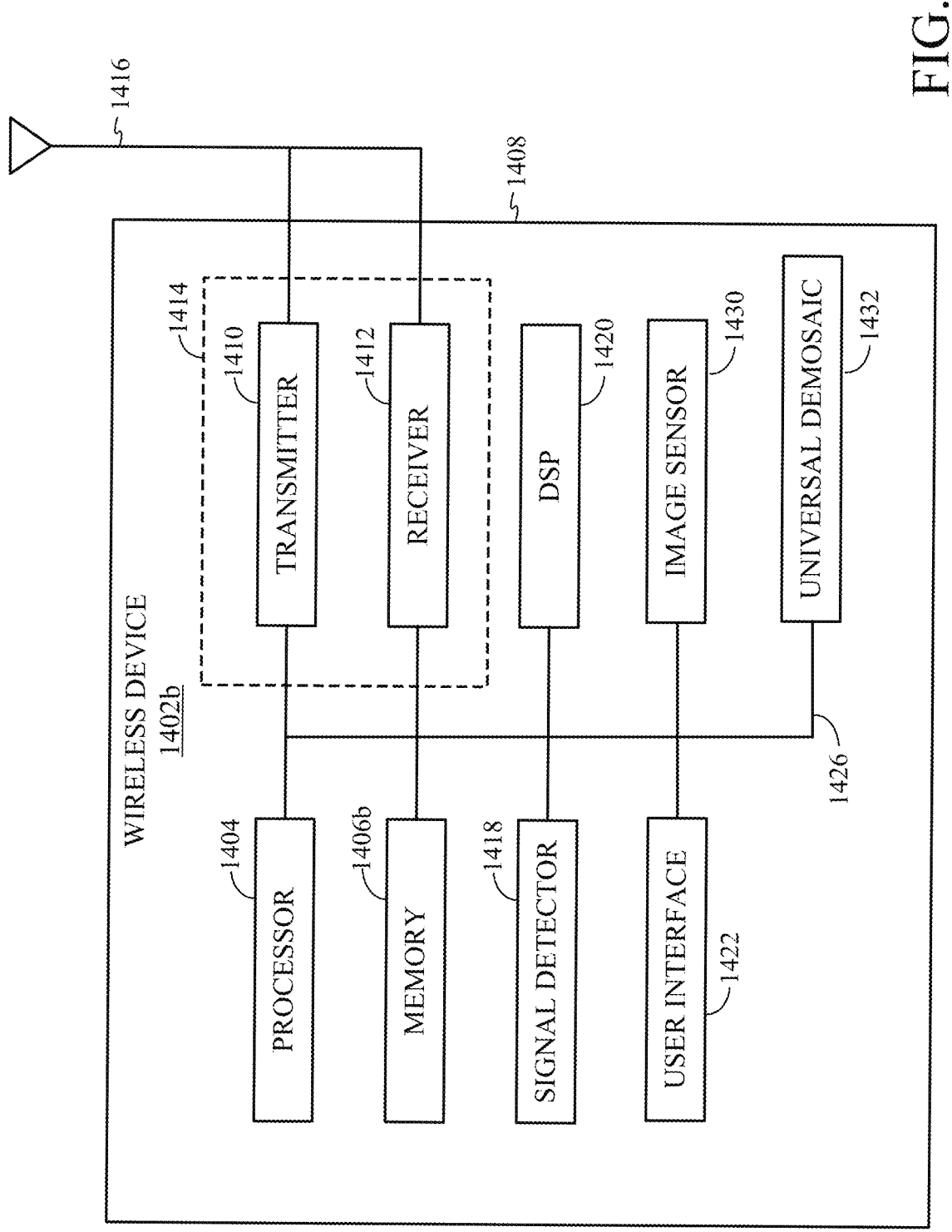
FIG. 14B illustrates an embodiment of a wireless device of one or more of the mobile devices of FIG. 1.
Figure 15:
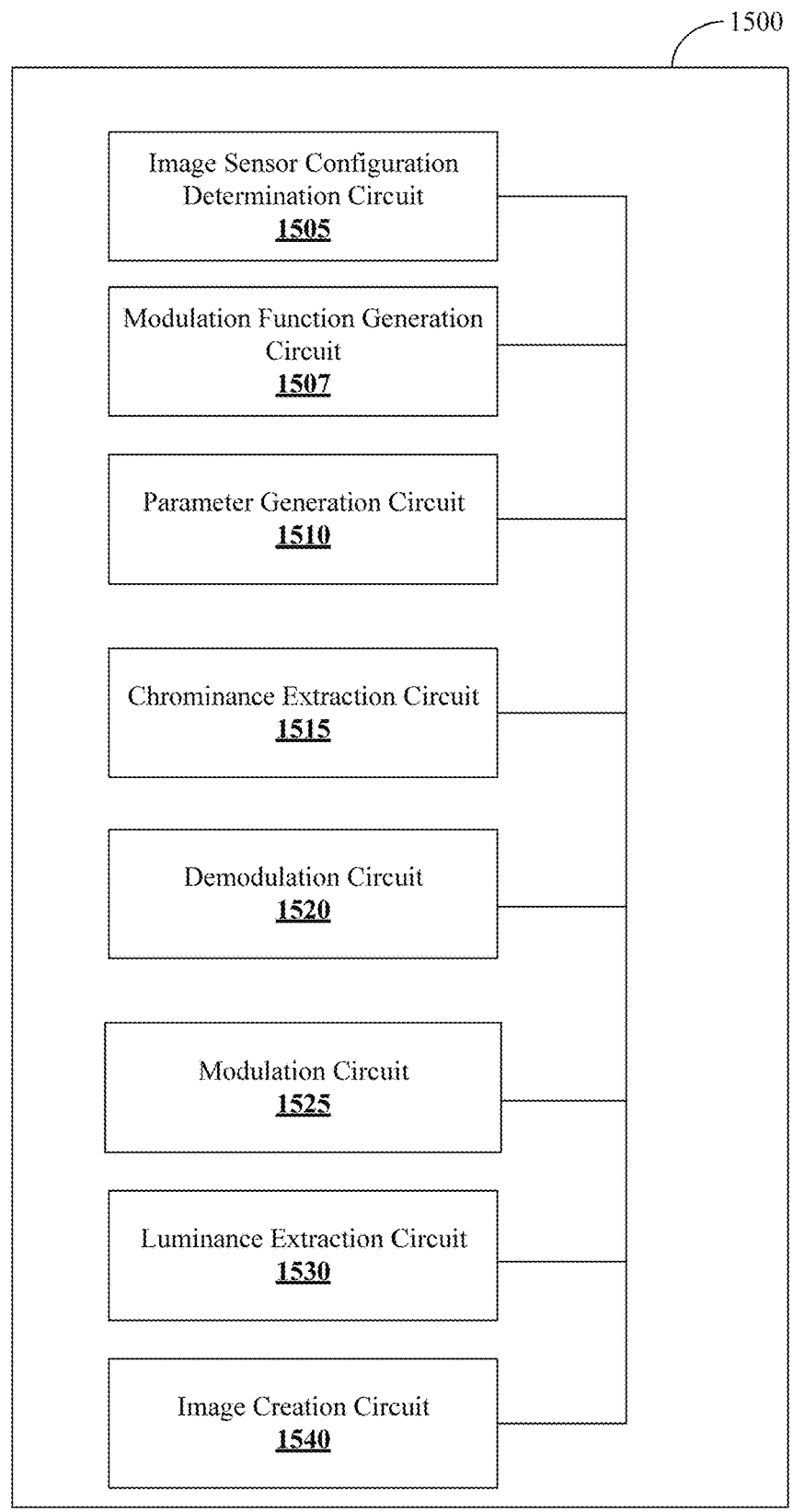
FIG. 15 is a functional block diagram of an exemplary device that may implement one or more of the embodiments disclosed above.

Although a number of separate components are illustrated in FIG. 15, those of skill in the art will recognize that one or more of the components may be combined or commonly implemented. For example, the processor 1404 may be used to implement not only the functionality described above with respect to the processor 1404, but also to implement the functionality described above with respect to the signal detector 1418 and/or the DSP 1420. Further, each of the components illustrated in FIG. 14 may be implemented using a plurality of separate elements.

The wireless device 1402a may be used to transmit and/or receive communications. Certain aspects contemplate signal detector 1418 being used by software running on memory 1406a and processor 1404 to detect the presence of a transmitter or receiver.

FIG. 14B shows an exemplary functional block diagram of a wireless device 1402b that may implement one or more of the disclosed embodiments. The wireless device 1402b may include components similar to those shown above with respect to FIG. 14B. For example, the device 1402b may include a processor 1404 which controls operation of the wireless device 1402b. The processor 1404 may also be referred to as a central processing unit (CPU). Memory 1406b, which may include both read-only memory (ROM) and random access memory (RAM), may provide instructions and data to the processor 1404. A portion of the memory 1406b may also include non-volatile random access memory (NVRAM). The processor 1404 typically performs logical and arithmetic operations based on program instructions stored within the memory 1406b. The instructions in the memory 1406b may be executable to implement the methods described herein. In some aspects, the instructions stored in the memory 1406b may differ from the instructions stored in the memory 1406a of FIG. 14A. For example, as discussed above, in some aspects, the processor 1404 of FIG. 14A may be configured by instructions stored in the memory 1406a to perform one or more of the methods disclosed herein. In the alternative, the processor 1404 in the device 1402b may perform the methods disclosed herein in concert with a universal demosaic component 1432, discussed below.

The processor 1404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The universal demosaic component 1432 may be configured to demosaic data received from the image sensor 1430. The universal demosaic 1432 may receive information defining a configuration of the image sensor from one or more of the processor 1404 and/or the image sensor 1430. The configuration data may include data indicating a configuration of image sensor elements of the image sensor 1430, for example, as described above with respect to FIG. 1, 2 or 3, and information indicating a configuration of filters that filter light before it reaches the image sensor elements. Based at least on the received image sensor configuration information, the universal demosaic may demosaic data generated by the image sensor 1430. The universal demosaic component may then output data defining a triple plane image onto the data bus 1426.

The wireless device 1402b may also include a housing 1408 that may include a transmitter 1410 and/or a receiver 1412 to allow transmission and reception of data between the wireless device 1402b and a remote location. The transmitter 1410 and receiver 1412 may be combined into a transceiver 1414. An antenna 1416 may be attached to the housing 1408 and electrically coupled to the transceiver 1414. An image sensor 1430 may capture images and make image data available to the processor 1404. In some aspects, the image sensor 1430 may be configured to capture any one or more of the images 100, 200, or 300 discussed herein. The wireless device 1402b may also include (not shown) multiple transmitters, multiple receivers, multiple transceivers, and/or multiple antennas.

The wireless device 1402b may also include a signal detector 1418 that may be used in an effort to detect and quantify the level of signals received by the transceiver 1414. The signal detector 1418 may detect such signals as total energy, energy per subcarrier per symbol, power spectral density and other signals. The wireless device 1402b may also include a digital signal processor (DSP) 1420 for use in processing signals. The DSP 1420 may be configured to generate a packet for transmission. In some aspects, the packet may comprise a physical layer data unit (PPDU).

The wireless device 1402b may further comprise a user interface 1422 in some aspects. The user interface 1422 may comprise a keypad, a microphone, a speaker, and/or a display. The user interface 1422 may include any element or component that conveys information to a user of the wireless device 1402b and/or receives input from the user.

The various components of the wireless device 1402b may be coupled together by a bus system 1426. The bus system 1426 may include a data bus, for example, as well as a power bus, a control signal bus, and a status signal bus in addition to the data bus. Those of skill in the art will appreciate the components of the wireless device 1402b may be coupled together or accept or provide inputs to each other using some other mechanism.

Although a number of separate components are illustrated in FIG. 15, those of skill in the art will recognize that one or more of the components may be combined or commonly implemented. For example, the processor 1404 may be used to implement not only the functionality described above with respect to the processor 1404, but also to implement the functionality described above with respect to the signal detector 1418 and/or the DSP 1420. Further, each of the components illustrated in FIG. 14 may be implemented using a plurality of separate elements.

The wireless device 1402b may be used to transmit and/or receive communications. Certain aspects contemplate signal detector 1418 being used by software running on memory 1406b and processor 1404 to detect the presence of a transmitter or receiver.

FIG. 15 is a functional block diagram of an exemplary device 1500 that may implement one or more of the embodiments disclosed above. The device 1500 includes an image sensor configuration determination circuit 1505. In an embodiment, the determination circuit 1505 may be configured to perform one or more of the functions discussed above with respect to block 1305. In an embodiment, the determination circuit 1505 may include an electronic hardware processor, such as processor 1404 of FIG. 14A or 14B. The determination circuit 1505 may also include one or more of a processor, signal generator, transceiver, decoder, or a combination of hardware and/or software component(s), circuits, and/or module(s).

The device 1500 further includes a modulation function generation circuit 1507. In an embodiment, the modulation function generation circuit 1507 may be configured to perform one or more of the functions discussed above with respect to block 1310. In an embodiment, the modulation function generation circuit 1507 may include an electronic hardware processor, such as processor 1404 of FIG. 14A or 14B. In some aspects, the modulation function generation circuit 1507 may comprise one or more of a processor, signal generator, transceiver, decoder, or a combination of hardware and/or software component(s), circuits, and/or module(s). In some aspects, the modulation function generation circuit 1507 may include the universal demosaic 1432 shown above in FIG. 14B.

The device 1500 further includes a parameter generation circuit 1510. In an embodiment, the parameter generation circuit 1510 may be configured to perform one or more of the functions discussed above with respect to block 1355. In an embodiment, the parameter generation circuit 1510 may include an electronic hardware processor, such as processor 1404 of FIG. 14A or 14B. In some aspects, the parameter generation circuit 1510 may comprise one or more of a processor, signal generator, transceiver, decoder, or a combination of hardware and/or software component(s), circuits, and/or module(s).

The device 1500 further includes a chrominance extraction circuit 1515. In an embodiment, the chrominance extraction circuit 1515 may be configured to perform one or more of the functions discussed above with respect to block 1360. In an embodiment, the chrominance extraction circuit 1515 may include an electronic hardware processor, such as processor 1404 of FIG. 14A or 14B. In some aspects, the chrominance extraction circuit 1515 may comprise one or more of a processor, signal generator, transceiver, decoder, or a combination of hardware and/or software component(s), circuits, and/or module(s).

The device 1500 further includes a demodulation circuit 1520. In an embodiment, the demodulation circuit 1520 may be configured to perform one or more of the functions discussed above with respect to block 1365. In an embodiment, the demodulation circuit 1520 may include an electronic hardware processor, such as processor 1404 of FIG. 14A or 14B. In some aspects, the demodulation circuit 1520 may comprise one or more of a processor, signal generator, transceiver, decoder, or a combination of hardware and/or software component(s), circuits, and/or module(s).

The device 1500 further includes a modulation circuit 1525. In an embodiment, the modulation circuit 1525 may be configured to perform one or more of the functions discussed above with respect to block 1370. In an embodiment, the modulation circuit 1525 may include an electronic hardware processor, such as processor 1404 of FIG. 14A or 14B. In some aspects, the modulation circuit 1525 may comprise one or more of a processor, signal generator, transceiver, decoder, or a combination of hardware and/or software component(s), circuits, and/or module(s).

The device 1500 further includes a luminance extraction circuit 1530. In an embodiment, the luminance extraction circuit 1530 may be configured to perform one or more of the functions discussed above with respect to block 1375. In an embodiment, the luminance extraction circuit 1530 may include an electronic hardware processor, such as processor 1404 of FIG. 14A or 14B. In some aspects, the luminance extraction circuit 1530 may comprise one or more of a processor, signal generator, transceiver, decoder, or a combination of hardware and/or software component(s), circuits, and/or module(s).

The device 1500 further includes an image creation circuit 1540. In an embodiment, the image creation circuit 1540 may be configured to perform one or more of the functions discussed above with respect to block 1320. In an embodiment, the image creation circuit 1540 may include an electronic hardware processor, such as processor 1404 of FIG. 14A or 14B. In some aspects, the image creation circuit 1540 may comprise one or more of a processor, signal generator, transceiver, decoder, or a combination of hardware and/or software component(s), circuits, and/or module(s). For example, in some aspects, the image creation circuit 1540 may include the universal demosaic 1432 and the processor 1404. For example, the universal demosaic 1432 may generate data for the triple plane image and send the data to the processor 1404. The processor may then generate the image.

Another embodiment resamples non-Bayer CFA sensors and outputs a RGB-CFA Bayer pattern. The Bayer color filter array (CFA) pattern has been the defacto standard for generating digital RGB color images with a single image sensor for the past two decades. However, a number of other CFA patterns have recently gained popularity because of their superior spectral-compression performance, improved signal-to-noise ratio, or ability to provide HDR imaging. The use of non-Bayer image sensors that include near infra-red (NIR) and white pixel, in addition to the traditionally used RGB spectral pixels, has become popular for computer vision and low-light imaging. Since the Bayer pattern has dominated the sensor industry for a long time, considerable research has gone into developing efficient algorithms for reconstructing high-quality full RGB images from Bayer CFA observations.

CFA Resampling for Converting Non-Bayer CFA Pattern to Bayer CFA Pattern

Non-Bayer CFA sensors may include a wide variation in the number of spectral bands, the spectral response curve of each band, and the spatial arrangement of the spectral filters constituting the CFA sensor. For example, as shown in FIGS. 2 and 3, the spatial arrangement and the size of pixels may vary between non-Bayer CFA sensors, such as a Lukac CFA (FIG. 3) and a Bayer with larger pixel sizes providing additional spectral components (FIG. 2). With many non-Bayer CFA sensors existing and most available research dedicated to Bayer CFA sensors and images, non-Bayer CFA images are usually interpolated using a sensor-manufacturers' proprietary algorithms specifically designed to interpolate only the CFA patterns developed.

In addition to or alternative to a device being configured to determine the functions for processing a non-Bayer CFA pattern data into luminance and chrominance values for processing captured images using the non-Bayer CFA sensor (such as described above), a device may be configured to resample non-Bayer CFA pattern data to a Bayer pattern and then perform color interpolation using a Bayer demosaic process. In this manner, any suitable Bayer demosaic process may be used in processing a captured image (and thus interpolate the colors in the image from the image data). In some example implementations, a device may include a CFA resampler configured to receive captured data from the image sensor. The CFA resampler (or resampler) may be configured to take as input a periodic CFA pattern and output a RGB-CFA Bayer pattern.

For example, an image sensor samples received light from a scene for image capture. The sampling may be periodic (such as 24 frames per second, 30 frames per second, or at another frame rate of the camera). Alternatively, the sampling may be on-demand, such as when a command for capturing an image is received. If the image sensor is a non-Bayer pattern image sensor, the pixels of the image sensor may not be arranged in a Bayer pattern. As a result, the data captured by the image sensor is not in the same format as from a Bayer pattern image sensor. The CFA resampler may sample the measurements (samples) from the non-Bayer pattern image sensor in order to convert the image sensor data to RGB-Bayer pattern data that may be processed using a Bayer demosaic for determining the color information for each portion of an image.

An example device including a CFA resampler may be the wireless device 1402*a* (FIG. 14A) or the wireless device 1402*b* (FIG. 14B). In some example implementations of the wireless device 1402*a* or 1402*b*, the CFA resampler may be included in an image processing front end (not shown) coupled to the image sensor 1430 that may be configured to capture image data with a non-Bayer CFA pattern of sensor pixels.

Figure 16:
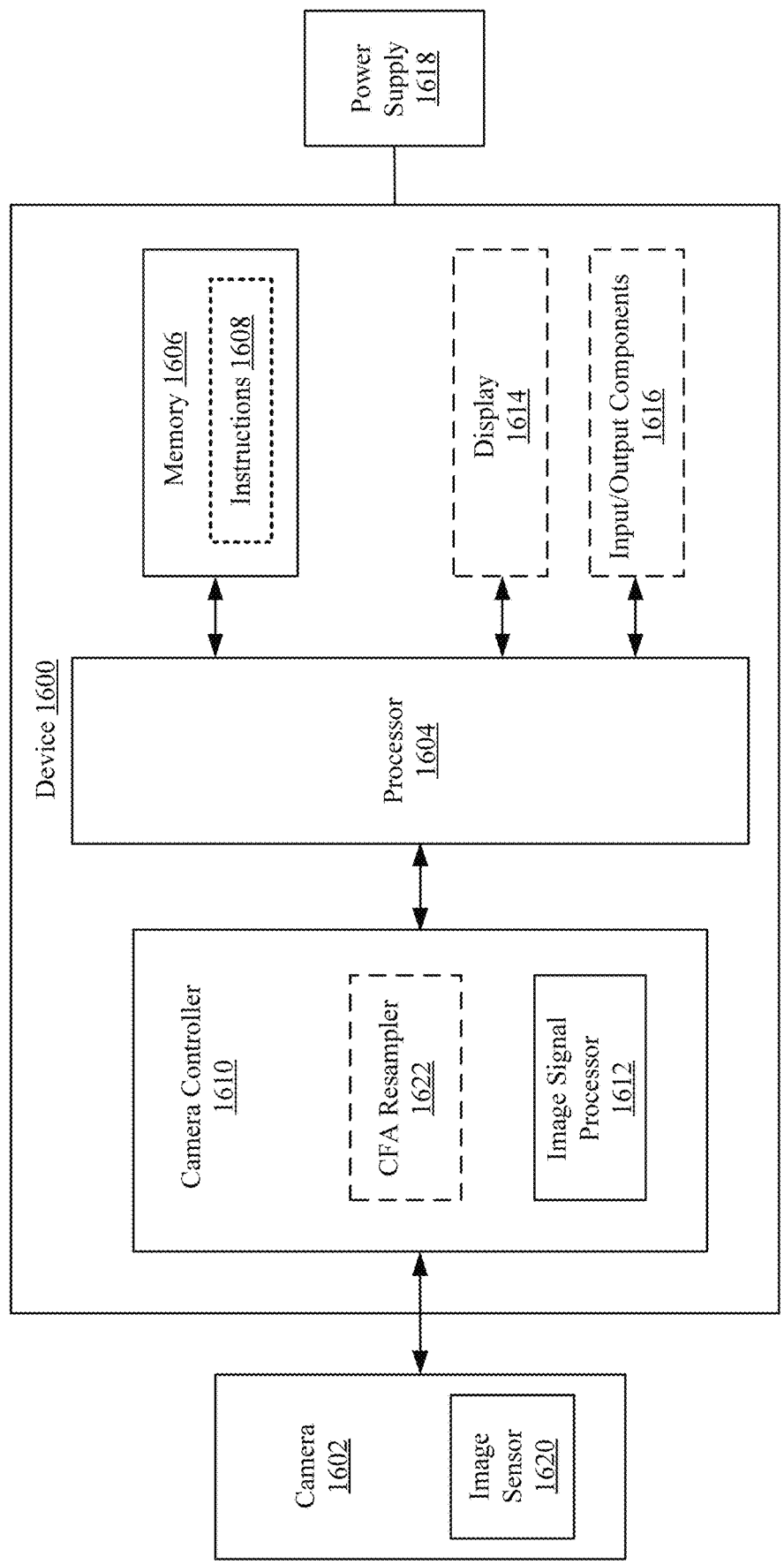
FIG. 16 is a block diagram of an example device for performing CFA resampling of non-Bayer CFA pattern data.

FIG. 16 is a block diagram of another example device 1600 for performing CFA resampling of non-Bayer CFA pattern data. The example device 1600 may include or be coupled to a camera 1602, a processor 1604, a memory 1606 storing instructions 1608, and a camera controller 1610. The device 1600 may optionally include (or be coupled to) a display 1614 and one or more input/output (I/O) components 1616. The device 1600 may include additional features or components not shown. For example, a wireless interface, which may include a number of transceivers and a baseband processor, may be included for a wireless communication device (such as the wireless device 1402*a* in FIG. 14A or the wireless device 1402*b* in FIG. 14B). The device 1600 may include or be coupled to additional cameras other than the camera 1602. The disclosure should not be limited to any specific examples or illustrations, including the example device 1600, the wireless device 1402*a* or the wireless device 1402*b*.

The camera 1602 may be capable of capturing individual image frames (such as still images) and/or capturing video (such as a succession of captured image frames). The camera

1602 may include an image sensor 1620. The camera 1602 may include additional image sensors, such as for a dual camera module or any other suitable module with multiple image sensors. The image sensor 1620 may have an array of pixels for capturing image data for image capture. Each pixel may have a color filter so that the pixel captures light within a spectral range. For example, for a Bayer sensor, 50% of the pixels include a green color filter so that the pixels capture light with a frequency associated with the color green, 25% of the pixels include a blue color filter so that the pixels capture light with a frequency associated with the color blue, and 25% of the pixels include a red color filter so that the pixels capture light with a frequency associated with the color red. The pixels with the filters are alternated for a Bayer pattern so that pixels with the same color filter do not neighbor one another. For a non-Bayer pattern CFA image sensor, the filters (and associated pixels) may be arranged in different ways. For the image sensor 1620, the arrangement of the pixels, size of the pixels, or dynamic measurement range for the pixels may differ from a Bayer pattern, and therefore the image sensor 1620 may include a non-Bayer CFA pattern.

The memory 1606 may be a non-transient or non-transitory computer readable medium storing computer-executable instructions 1608 to perform all or a portion of one or more operations described in this disclosure. The device 1600 may also include a power supply 1618, which may be coupled to or integrated into the device 1600.

The processor 1604 may be one or more suitable processors capable of executing scripts or instructions of one or more software programs (such as instructions 1608) stored within the memory 1606. In some aspects, the processor 1604 may be one or more general purpose processors that execute instructions 1608 to cause the device 1600 to perform any number of functions or operations. In additional or alternative aspects, the processor 1604 may include integrated circuits or other hardware to perform functions or operations without the use of software. While shown to be coupled to each other via the processor 1604 in the example device 1600, the processor 1604, the memory 1606, the camera controller 1610, the optional display 1614, and the optional I/O components 1616 may be coupled to one another in various arrangements. For example, the processor 1604, the memory 1606, the camera controller 1610, the optional display 1614, and/or the optional I/O components 1616 may be coupled to each other via one or more local buses (not shown for simplicity).

The display 1614 may be any suitable display or screen allowing for user interaction and/or to present items (such as captured images, video, or a preview image and an indication of the final orientation) for viewing by a user. In some aspects, the display 1614 may be a touch-sensitive display. The I/O components 1616 may be or include any suitable mechanism, interface, or device to receive input (such as commands) from the user and to provide output to the user. For example, the I/O components 1616 may include (but are not limited to) a graphical user interface, keyboard, mouse, microphone and speakers, and so on. The display 1614 and/or the I/O components 1616 may provide a preview image or image being captured to a user and/or receive a user input for adjusting the displayed image's orientation or the orientation of an image to be captured.

The camera controller 1610 may include an image signal processor 1612, which may be one or more image signal processors to process captured image frames or video provided by the camera 1602. The image signal processor 1612 may be configured to process Bayer raw data/Bayer pattern image data. In some example implementations, the camera controller 1610 (such as the image signal processor 1612) may also control operation of the camera 1602. In some aspects, the image signal processor 1612 may execute instructions from a memory (such as instructions 1608 from the memory 1606 or instructions stored in a separate memory coupled to the image signal processor 1612) to process image frames or video captured by the camera 1602 and/or control the camera 1602. In some example implementations, the image signal processor 1612 may execute instructions for performing CFA resampling of captures from the non-Bayer CFA pattern image sensor 1620, and the sampled information may be converted to Bayer pattern data for image processing (such as by an image processing pipeline of the device 1600, including the image signal processor 1612).

In some other aspects, the image signal processor 1612 may include specific hardware to process image frames or video captured by the camera 1602. In some example implementations, the image signal processor 1612 may include a CFA resampler circuit for converting sampled image data from the image sensor 1620 to Bayer pattern data for image processing. The image signal processor 1612 may alternatively or additionally include a combination of specific hardware and the ability to execute software instructions.

In some other aspects, the camera controller 1610 may include an optional CFA resampler 1622 separate from the image signal processor 1612 and configured to sample data from the image sensor 1620. In some example implementations, the CFA resampler 1622 may be configured to process signals as spectral frequencies for resampling the samples from the image sensor 1620. In some other example implementations, the CFA resampler 1622 may be configured to operate in the digital domain.

In some other aspects, the CFA resampler may be included in the camera 1602 and coupled to the image sensor 1620 for resampling or converting the non-Bayer CFA pattern data before processing the converted information in determining a final image. While some example device configurations are illustrated, any suitable device may be used for performing CFA resampling, and the present disclosure should not be limited to a specific device. For example, example embodiments of the CFA resampler may be implemented at the front-end of any image signal processing (ISP) unit designed to process Bayer raw data. In this manner, a Bayer ISP may be configured to process data from a non-Bayer CFA image sensor by first re-sampling the non-Bayer pattern image data to a Bayer grid (Bayer pattern image data) and then using the processing pipeline to generate an image (such as a full resolution RGB image).

In the following examples, the device 1600 (FIG. 16) is described as performing one or more of the processes. However, any suitable device may be used (including wireless device 1402*a* or 1402*b*), and the device 1600 is used for illustrative purposes only. The present disclosure should not be limited to a specific device.

FIG. 17 is an illustrative flow chart depicting an example operation 1700 for generating image data in a Bayer pattern from image data sampled by a non-Bayer CFA image sensor. Beginning at 1702, the device 1600 may use a non-Bayer CFA image sensor (such as image sensor 1620) to sample light received from a scene when an image of the scene is to be captured. For example, the device 1600 may sample the pixel measurements for the light hitting each sensor pixel, with the samplings together being non-Bayer pattern CFA image data.

The device 1600 may then resample the image data (samplings) from the non-Bayer CFA image sensor (1704). For example, the CFA resampler 1622 or image signal processor 1612 may receive and resample the non-Bayer pattern CFA image data. In some example implementations, the resampling may be performed at the same frequency as the active capture rate of the image sensor 1620. In some other example implementations, the resampling may be for an interval number of samplings from the image sensor 1620, or a determination of when to resample may be based on a user input for capturing an image.

The device 1600 may thus generate, based on the resampling, resampled image data in a Bayer pattern (1706). In this manner, the image signal processor 1612 or other portion of the image processing pipeline configured to process Bayer patterned image data optionally may process the resampled image data in a Bayer pattern to generate an image (1708). For example, the resampled image data in a Bayer pattern may be used in constructing the color information for different portions of the image.

CFA Resampling Using Non-Iterative Maximum a Posteriori Estimation

Some example implementations of a CFA resampler is based on a statistical maximum a-posteriori (MAP) framework. The sampling from the image sensor 1620 may be sequential and a predefined order. Similarly, the resampling process may be an in-order resampling of the sampling data. A linear model may define a forward/in-order process of spatio-spectral sampling. Similarly, a linear model may define the resampling from the non-Bayer CFA image data to Bayer pattern image data. In this manner, if the linear model is known (such as may be determined from the CFA pattern, pixel size, and so on), the linear model may be inverted and applied to the data to reconstruct an image. A CFA resampler may be pre-computed for the image sensor and stored for recovering the MAP estimates of the linear model for converting captured non-Bayer CFA image data to Bayer CFA samples. However, since non-Bayer CFA sensors are typically proprietary, the linear model may not be known without attempting to construct the model from observations of sampling data from the image sensor. Samplings may be used in determining MAP estimates for the CFA resampler to convert non-Bayer patterned data to Bayer patterned data. Inverting the linear model with unknowns and samplings from the image sensor to determine the MAP estimates may require an iterative process that is computationally and time intensive (which may be impractical for real-time applications, such as displaying, to a user, images recently captured and processed). Therefore, a non-iterative MAP (NMAP) estimate determination may reduce computation and time requirements by removing the recursions in solving for the estimates.

In some example implementations for performing NMAP estimation, some variables may be assumed to be known so that recursively solving for different unknowns may not be required. For example, the colors of the color filters may be unknown. One assumption may be that the color filters constituting the pattern of the non-Bayer CFA image sensor are comprised of red, blue, and green filters (for RGB). Another example unknown is how are the color filters arranged. For example, a Bayer sensor may be a 2 pixel×2 pixel pattern block of the color filters (as shown in FIG. 1) repeated throughout the image sensor. One assumption may be that the pattern in the non-Bayer patterned CFA image sensor is a linear combination of the color filters. For example, a block of color filters may be repeated throughout the image sensor. A further example unknown is the noise affecting the image sensor. One assumption may be that the image sensor noise is Gaussian. Another example unknown may be if the mapping between non-Bayer CFA image data to Bayer patterned image data may change for different image data or temporally. One assumption may be that the model is a Markov Random Field (MRF) that remains the same over time and space. For example, the model may be a homogeneous Gaussian MRF (GMRF). With the example assumptions, the resampling may be linear and data-independent (with resampling for portions of an image not dependent on other portions of the image). In this manner, the resampler may be determined/estimated once for a pattern of a non-Bayer CFA image sensor. For example, the variables for performing the mapping from non-Bayer CFA data to Bayer pattern data may be estimated for the resampler, and the estimated resampler may be stored and used to generate Bayer pattern image data from future samplings of the image sensor.

FIG. 18 is an illustrative flow chart depicting an example operation 1800 for determining a CFA resampler (resampler) to be used in mapping non-Bayer CFA image sensor samplings to Bayer pattern image data. Beginning at 1802 for determining the resampler (or the model to be performed in resampling), a known test image may be sampled by the non-Bayer CFA image sensor. In some example implementations, test images are one or more of the set of 24 images released by Kodak® for analyzing and comparing image compression techniques. However, any suitable test images may be used in determining the resampler.

Proceeding to 1804, the sampling of the test image from the non-Bayer CFA image sensor is divided into portions. In some aspects, the portions may be of uniform size. In some example implementations, the image sensor may be visually inspected or documentation about the image sensor may indicate the number of pixels and the arrangement of the color filters. In this manner, a pattern of color filters and pixels may be observed to be repeated throughout the image sensor. The pattern may thus indicate the size of the portion for which the samplings are to be divided.

In the examples, the three CFA patterns shown in FIG. 1, FIG. 2, and FIG. 3 are used. As described above, FIG. 1 illustrates an example 2×2 Bayer pattern block of pixels with pure RGB spectral components (only RGB color filters, with one color filter per pixel). FIG. 2 illustrates an example modified 3×3 Bayer block of pixels with color filters 1.5 times the pixel size. For the example modified Bayer block, the color filters overlap for portions of neighboring pixels, and as a result, there are six spectral components in the pattern: red (R), green (G), blue (B), yellow ($Y=(R+G)/2$); cyan ($C=(B+G)/2$); and white ($W=(R+2G+B)/4$). Color filters being larger than the pixel may potentially be used when pixel sizes are in the sub-micron range, as color filters with equally small sizes may not be practical. FIG. 3 illustrates an example 4×4 Lukac pattern block with pure RGB spectral components. The examples are for illustrative purposes only, as any suitable CFA pattern for the image sensor may be used. Therefore, the present disclosure should not be limited to a specific CFA pattern.

In some example implementations, the repeated portion of pixels and color filters for the image sensor comprises rectangular pixels placed on a 2-dimensional N×N pixel spatial grid of the image sensor. If the size of the portions is uniform, the size of the portion repeated throughout the N×N spatial grid may be a block of p×p pixels. While the block is defined as p×p pixels for illustrative purposes, the block may be p×p values with less than $p^2$ pixels is the size of the color filters are greater than 1× the size of the pixels.

In this manner, the periodicity of the mosaic pattern may be every p pixels in the horizontal direction and every p pixels in the vertical direction. While a square grouping of pixels is described in the examples, any size portion of pixels may be repeated in the image sensor (such as rectangular, hexagonal, or any other suitable shape). Further, an image sensor of N×N pixels is described, but any suitable size image sensor may be used. In addition, determining a resampler may be performed for only a portion of the image sensor or for all of the image sensor.

Assuming that the color filters are from the 3 RGB color filters, $x \in \mathbb{R}^{3N^2}$ may denote the unknown 3-channel vectorized RGB image (with each pixel of the image corresponding to a vector of R, G, and B, leading to 3(N×N) real number data points); $y \in \mathbb{R}^{N^2}$ may denote the spectral samples captured using the image sensor (with each point in the N×N spatial grid providing a real number measurement); $A \in \mathbb{R}^{N^2 \times 3N^2}$ may denote the spatio-spectral sampling operator for converting x to form y (the operator depicting the conversion of the image denoted by x to the samplings from the image sensor denoted by y); i may denote the vectorial location of a pixel or location of the image sensor according to an ordering of pixels or locations; and $n \in \mathbb{R}^{N^2}$ may denote the noise to the N×N grid of pixels of the image sensor. In some example implementations, the noise may be purely additive noise (in addition to the data corresponding to the image. Further, the noise may have a zero mean distribution, such as Gaussian noise with a covariance matrix $\Lambda = E[n^T n] = \sigma^2 I$.

Using the above nomenclature, the forward model depicting the image sensor samples y as the vectorized image x multiplied by the operator A, with the noise n added to the samplings, is depicted in equation (26) below:

$$y = Ax + n \qquad (26)$$

Figure 19:
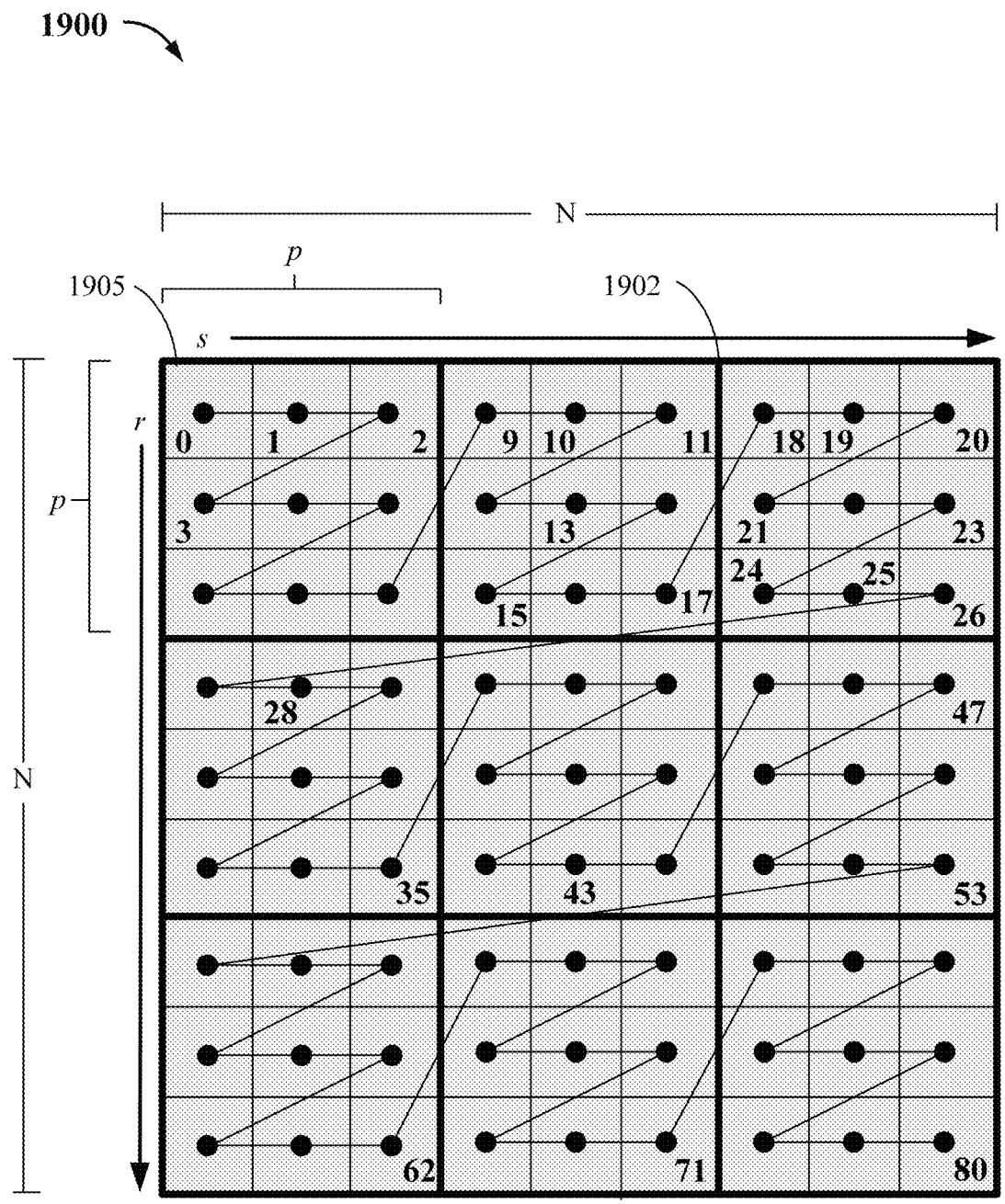
FIG. 19 is a depiction of an example image for an image sensor to capture with an example pixel ordering.

Referring back to 1804 in FIG. 18 of dividing the samplings into portions (such as samplings from the repeated p×p pixel (or value) blocks), FIG. 19 is a depiction 1900 of an example image 1902 for an image sensor to capture with an example pixel ordering. The pixel ordering for an example image (or image portion) of $N^2$ pixels may be i from 0 to $N^2-1$, with $i \in \{0, \ldots, N^2-1\}$. An example block of pixels corresponding to the block of pixels of the image sensor repeated throughout the image sensor (which may be called a CFA unit cell) is illustrated as larger squares drawn with thicker lines, and including p×p number of pixels (such as CFA unit cell 1905). The first CFA unit cell of the N×N spatial grid may be located at the top-left corner, with the top-left pixel indicated by "0". As shown, the ordering of the pixels is from left to right, top to bottom, through the current CFA unit cell until the last pixel is reached. The ordering then continues at the top-left pixel of the neighboring right CFA unit cell. After the ordering of all pixels in the CFA unit cells along a row, the top-left pixel of the left CFA unit cell of the neighboring row below is the next pixel in the ordering. The ordering continues until the pixel at the Cartesian location N×N is reached. In this manner, the size of the portions of the samplings from the non-Bayer CFA image sensor may correspond to the size of the CFA unit cell. The CFA unit cell size is depicted as 3×3 and the spatial grid size is depicted at 9×9 for illustrative purposes only, as the cell and spatial grid may be any suitable size.

Proceeding to 1806 in FIG. 18, a sampling filter may be determined. If the portion of pixels and color filters (such as a 3×3 block of pixels) is repeated throughout the image sensor, a sampling filter may be determined for a portion of the samplings from the image sensor. For example, if a 2×2 block of pixels with 1× pixel size color filters is repeated throughout a non-Bayer pattern CFA image sensor (with only the arrangement of the color filters differing from a Bayer pattern), a sampling filter for converting the data from a 2×2 block of non-Bayer pattern CFA pixels to image data corresponding to a 2×2 pixel Bayer pattern block may be determined.

If the number of pixels in a CFA unit cell differs from the Bayer pattern block, or if the size of the color filters is not 1× the pixel size, one CFA unit cell may not correspond to one Bayer pattern block. The number of image data values for a CFA unit cell may differ from 4, which may be the number of values from a 2×2 pixel Bayer pattern block. For example, a 4×4 Lukac pattern block (FIG. 3) may have 16 image data values for a unit cell, and the size of the Lukac pattern block may correspond to 4 Bayer pattern blocks. As a result, the sampling filter be determined for a plurality of CFA unit cells, as the mapping of CFA unit cells to Bayer pattern blocks may not be one to one. In some example implementations, the resampler may perform linear operations that may be described in matrix form (with the resampling matrix corresponding to the size of image data to be converted). The sampling filter may thus be determined for a defined number of columns of the resampling matrix. In some other example implementations, the sampling filter may be determined for a defined number of rows of the resampling matrix.

Since the CFA pattern is repeated in the image sensor, the same sampling filter may be used for converting samplings from each portion corresponding to the size of the sampling filter. In some example implementations, the sampling filter may include operators for interpolating image data of a CFA unit cell to luminance values and chrominance values, or alternatively to RGB values. In some examples, the operators may be linear transformations.

After determining the sampling filter, the resampler may be determined based on the determined sampling filter (1808). In some example implementations, the resampler may include a sampling filter for converting the samplings for each CFA unit cell into Bayer pattern image data. In some other example implementations, the sampling filter may be configured to convert rows and/or columns of samplings into Bayer pattern image data. In some other example implementations, a full resampling matrix may be constructed based on the sampling filter (such as repeating the pattern of determined linear operations for the sampling filter to populate the resampling matrix).

When the resampler is determined once (such as through the use of one or more test images), the resampler may be used for future samplings from the non-Bayer pattern CFA image sensor (or samplings from image sensors with the same non-Bayer pattern). For example, the CFA resampler 1622 may be configured to convert future samplings from the image sensor 1620. In another example, a resampling matrix of linear operations may be stored and executed by a processor (such as image signal processor 1612) in converting samplings from the image sensor 1620.

Some example implementations of a sampling filter and determining the sampling filter are described below, with the relationships between an input image, the sampling from the non-Bayer pattern CFA image sensor, and the resamplings from the resampler described.

For a CFA unit cell size of $p^2$, and a spatial grid size of $N^2$, the vectorial location i of any pixel in the N×N spatial grid is related to its 2D Cartesian spatial coordinates (r, s), as depicted in equation (27) below:

$$i = pr \bmod p^2 + \left\lfloor \frac{r}{p} \right\rfloor pN + s \qquad (27)$$

Additionally, the phase Ø of a pixel i in a CFA unit cell may be one of $p^2$ possible locations, depicted in equation (28) below:

$$\emptyset = i \bmod p^2 \in \{0, 1, \ldots, p^2-1\}. \qquad (28)$$

In some example implementations, the sampling filter may include linear transformations, $T_l$, $T_{c_1}$, and $T_{c_2} \in \mathbb{R}^{N^2 \times 3N^2}$ that transform the correlated RGB data, x, of an input image into its three decorrelated luminance and chrominance components: $l \triangleq T_l x$, $c_1 \triangleq T_{c_1} x$, and $c_2 \triangleq T_{c_2} x \in \mathbb{R}^{N^2}$. Each transformation may be modeled as a 2D homogeneous Gaussian Markov random field (GMRF) prior model.

Regarding a GMRF prior model, the distribution of a Gaussian random field may be as depicted in equation (29) below:

$$g(x) = \frac{\lambda \sqrt{2}}{(2\pi)^{N/2}} |B|^{1/2} \exp\{-\lambda^2 x^t B x\} \qquad (29)$$

where B is a symmetric positive-definite matrix, λ is a constant, and $x^t$ is the transpose of x. Assuming the model is homogeneous and to correspond to a Gibbs distribution, with a form as depicted in equation (30) below:

$$p(x) = \frac{1}{z} \exp\left\{-\sum_{c \in C} V_c(x)\right\} \qquad (30)$$

where Z is a normalizing constant and $V_c$ is a function of a local group of points c in the set C of all local groups, the log likelihood of the Gaussian random field may be as depicted in equation (31) below:

$$\log g(x) = -\lambda^2 \left( \sum_{s \in S} a_s x_s^2 + \sum_{\{s,r\} \in C} b_{sr} |x_s - x_r|^2 \right) + c \qquad (31)$$

where $a_s = \Sigma_{r \in s} B$ and $b = -B_{sr}$. As a result, the MAP estimate may be the minimization of the cost function, as depicted in equation (32) below:

$$\hat{x} = \arg\min_x \{-L(y|x) + \lambda^2 (\Sigma_{s \in S} a_s x_s^2 + \Sigma_{\{s,r\} \in C} b_{sr} |x_s - x_r|^2)\} \qquad (32)$$

Determining the relationship between the samplings from the image sensor and the RGB values in the input images may include determining the linear models for the luminance and two chrominance components. In some example implementations of determining the linear models, the MAP estimate for each linear model may be determined.

In some example implementations, the matrix B may be a common precision matrix for describing the decorrelated components. For example, elements in the precision matrix B are non-zero only for neighbors and diagonal elements ($k \notin \{1, N_l\} \Leftrightarrow b_{k,l} = 0$). Additionally, the non-causal prediction variances for the luminance and chrominance GMRF models may be denoted by $\sigma_l^2$ and $\sigma_c^2$, respectively. The selection or determination of the GMRF model parameters B, $\sigma_l^2$, and $\sigma_c^2$ is described below.

Building on the general Gaussian random field description regarding equations (29)-(32) above, the MAP estimate of RGB components x of an image given the observations/samplings y from the image sensor may be as depicted in equation (33) below:

$$\hat{x} = \arg\min_{x \in \mathbb{R}^{3N^2}} \left\{ \frac{1}{2\sigma^2} \|y - Ax\|^2 + \frac{1}{2\sigma_l^2} x^T T_l^T B T_l x + \frac{1}{2\sigma_c^2} \sum_{k=1,2} x^T T_{c_k}^T B T_{c_k} x \right\} \qquad (33)$$

The ratios $\sigma/\sigma_l$ and $\sigma/\sigma_c$ may indicate an inverse relationship (trade-off) between a fit of modeling the relationship between the input values and the samplings and the smoothness of luminance and chrominance components from the modeled relationship.

In this manner, the model parameters to provide MAP estimate $\hat{x}$ may be determined using Equation (33). In some example implementations, an approximate solution may be determined using iterative optimization methods, such as gradient descent, conjugate gradient, etc., thus providing estimates for the model parameters. In some other example implementations, a non-iterative process for determining $\hat{x}$ may be performed, saving time and computational resources caused by iterative calculations for estimation. Some example non-iterative processes are described below regarding determining the sampling filter.

Referring back to equation (33), the MAP estimate may be computed in closed form, as depicted in equation (34) below:

$$\hat{x} = \left( A^T A + \frac{\sigma^2}{\sigma_l^2} T_l^T B T_l + \frac{\sigma^2}{\sigma_c^2} \sum_{k=1,2} T_{c_k}^T B T_{c_k} \right)^{-1} A^T y. \qquad (34)$$

The inverse matrix H for a given CFA pattern (such as per a CFA unit cell), which may be pre-computed, is as depicted in equation (35) below:

$$H \triangleq \left( A^T A + \frac{\sigma^2}{\sigma_l^2} T_l^T B T_l + \frac{\sigma^2}{\sigma_c^2} \sum_{k=1,2} T_{c_k}^T B T_{c_k} \right)^{-1} A^T \qquad (35)$$

In this manner, an estimation ($\hat{x}$) of the RGB components x of the image may be reconstructed from the samplings y from the image sensor by computing the matrix-vector product between H and y, as depicted in equation (36) below:

$$\hat{x} = Hy \qquad (36)$$

If the sampling filter is based on the process depicted in equations (34)-(36), and $A_b$ denotes the spatio-spectral sampling operator that maps the input image (with the components x) to the Bayer samples $y_b$, an estimate ($\hat{y}_b$) of the Bayer pattern data through resampling may be depicted in terms of $\hat{x}$, as depicted in equation (37) below:

$$\hat{y}_b = A_b \hat{x}. \qquad (37)$$

The spatio-spectral sampling operator $A_b$ may be known, as conversion of images to Bayer-pattern image data is well researched. Otherwise, the operator may be determined by converting a test image to Bayer-pattern image data, and comparing the Bayer-pattern image data to the test image to determine the sampling operator $A_b$.

Referring to equations (36) and (37), the operations performed by the resampler that estimates the Bayer pattern data $y_b(\hat{y}_b)$ given the non-Bayer CFA image sensor data y may be defined as depicted in equations (38) and (39) below:

$$\hat{y}_b = A_b\hat{x} \qquad (38)$$
$$= (A_b H)y$$
$$= Ry$$

where $$R \triangleq A_b H \in \mathbb{R}^{N^2 \times N^2}. \qquad (39)$$

Since the resampler operations R (which may be depicted in a resampling matrix) may be independent of the sensor samplings y, the resampler operations may be computed once for a given CFA pattern, and the resampler operations may then be used for future samplings from an image sensor with the given CFA pattern.

For large-N problems, R in equation (38) may be enormous and, therefore, direct computation of the matrix-vector product may require large amounts of storage and computational resources. In some example implementations, the structure of a resampling matrix for R (called resampling matrix R) may be exploited to reduce the computational resources, time, and memory needed for determining the resampler operations (and thus determining the resampler). For example, a smaller sampling filter, which may be a sub-matrix of the resampling matrix R, may be determined and used for converting image data from a non-Bayer pattern CFA image sensor.

An assumption of the sampling being modeled by a homogeneous GMRF prior model implies that the matrix B represents the application of a linear space invariant 2D filter to an image. The matrix B (which is symmetric) may have a block circulant structure with circulant blocks (BCCB), i.e., the matrix may be a block circulant matrix with each block, if treated as a matrix, also being a circulant matrix.

If the matrix B is a block circulant matrix, resampling operations (such as $R \in \mathbb{R}^{N^2 \times N^2}$, if conceptualized as a matrix) also may be a block circulant matrix with $p^2 \times p^2$ circulant blocks. In this manner, with a repeating structure of the size pxp pixels throughout the image sensor, the resampling matrix R may be depicted in terms of: (1) the coefficients of the first $p^2$ contiguous rows of the matrix, denoted by the sub-matrix $\mathcal{R}^R \in \mathbb{R}^{p^2 \times N^2}$, and/or (2) the coefficients of the first $p^2$ contiguous columns of the matrix, denoted by the submatrix $C^R \in \mathbb{R}^{N^2 \times p^2}$.

The rows of the resampling matrix R may represent 2D color interpolation filters vectorized according to the ordering scheme of pixel sampling, such as shown in FIG. 19. For example, the i-th row of the resampling matrix R may correspond to a 2D interpolation filter (which may be referred to as $h_{r,s}^{\phi,C}$) that estimates the missing spectral value $C \in \{R, G, B\}$ at vectorial location i of a pixel in the image from the resampled Bayer pattern data (with the relationship of the location i and the phase $\phi \in \{0, \ldots, p^2-1\}$ for the pixel shown, e.g., in Equation 28). The resampler operations (such as depicted by the resampling matrix R) may therefore represent operations (such as a set of $p^2$ space invariant 2D filters $h_{r,s}^{\phi,C}$) to be applied to the samplings y for determining the MAP estimate as the resampled Bayer data $y_b$ ($\hat{y}_b$).

Figure 20:
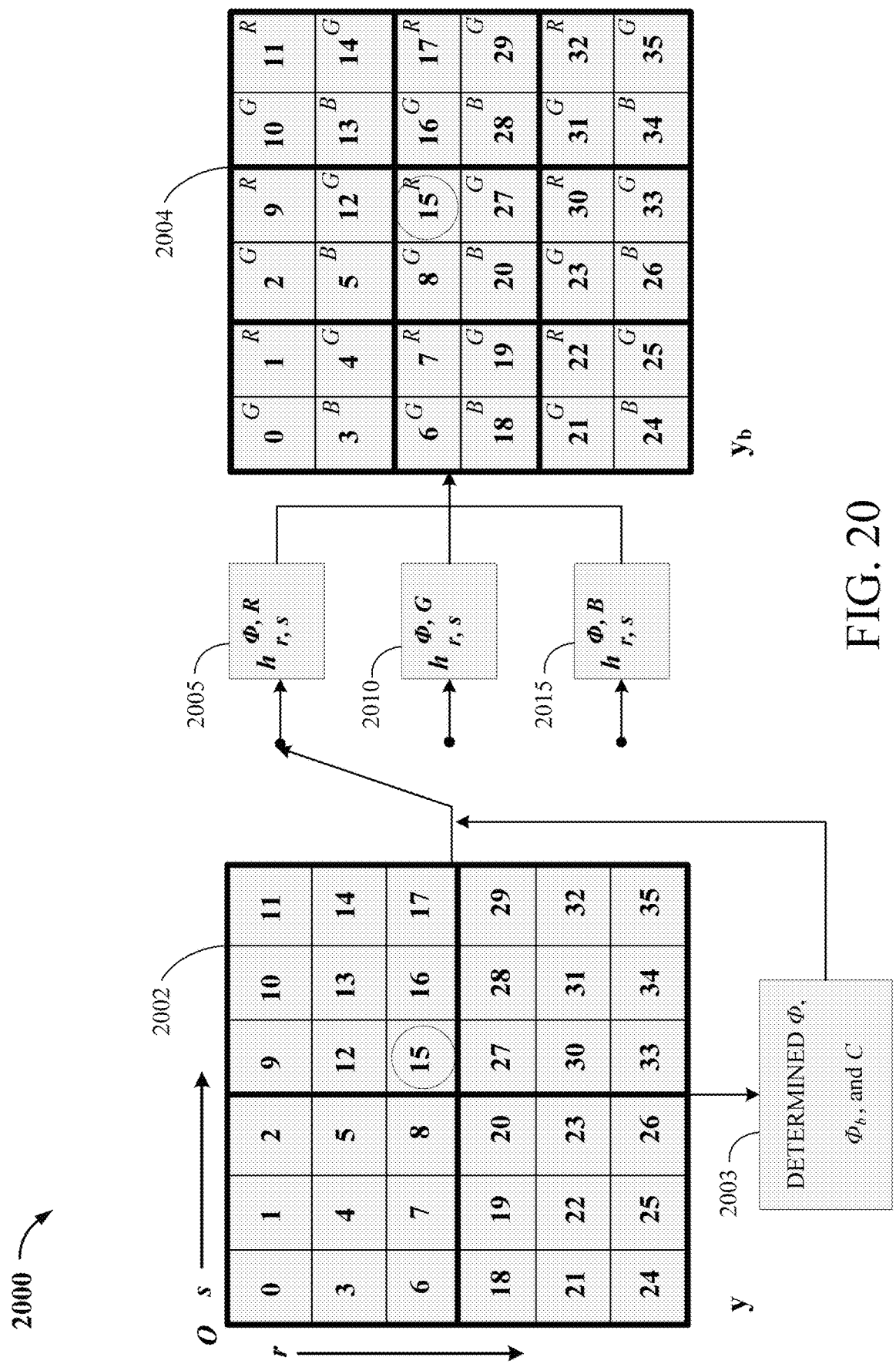
FIG. 20 is a depiction of an example resampling implementation.

FIG. 20 is a depiction 2000 of an example resampling implementation. In the example, samplings y (from the non-Bayer CFA image sensor) with pxp portions 2002 corresponding to a periodic pattern of pixels or image values (such as a CFA unit cell) may be mapped to the Bayer pattern image data $y_b$ 2004 (which may be estimated as $\hat{y}_b$) by using the set of interpolation filters $h_{r,s}^{\phi,R}$ 2005 for red, $h_{r,s}^{\phi,G}$ 2010 for green, and $h_{r,s}^{\phi,B}$ 2015 for blue. Size p is depicted as 3 for illustrative purposes only, and any suitable size and dimension portion may be used.

In determining a resampler, a value at one corresponding location in the Bayer pattern image data may be determined based on the value at location i in the non-Bayer image sensor samples y, and may further be based on one or more neighbor values of location i in the non-Bayer image sensor samples. As a result, the resampling matrix R may provide a one to one relationship between the samplings and resamplings, or may provide a multiple value to one value relationship between the samplings and resamplings (with the multiple values neighboring or close to one another).

For a resampling from an image sensor pixel with 2D Cartesian coordinates (r, s), the vectorial location i and the phase $\phi \in \{0, \ldots, p^2-1\}$ of a pixel in the non-Bayer pattern image data (samplings y) may be determined (2003), such as using equation (27) and equation (28) above. The Bayer pattern block (Bayer pattern CFA unit cell) may be of size 2×2 pixels. As a result, a phase $\phi_b$ within the Bayer pattern block of a resampling of the image data at vectorial location i with a phase $\phi$ is one of $\{0, 1, 2, 3\}$. If the ordering of pixels between the non-Bayer pattern and Bayer pattern is the same (e.g., the vectorial location i is the same in samples y and resamples $y_b$, such as depicted in FIG. 20), the phase $\phi_b$ of the resampling at location r,s in the N×N spatial grid for the Bayer pattern image data may be determined using equation (28) with p fixed to 2, as depicted in equation (40) below:

$$\phi_b = \left(2r \bmod 4 + \left\lfloor \frac{r}{2} \right\rfloor 2N + s \right) \bmod 4 \qquad (40)$$

Referring back to FIG. 1, the block of 2×2 pixels of a Bayer pattern may have the pattern of color filters as indicated in 100. In this manner, the $\phi_b$ value may indicate the spectral component $C \in \{R, G, B\}$ that is to be estimated at the pixel for the resampled Bayer pattern image data. For example, for the Bayer pattern in FIG. 1, the spectral component dependent based on the phase $\phi_b$ is as depicted in equation (41) below:

$$C \triangleq f(\phi_b) = \begin{cases} G, & \text{if } \phi_b = 0 \\ R, & \text{if } \phi_b = 1 \\ B, & \text{if } \phi_b = 2 \\ G, & \text{if } \phi_b = 3 \end{cases} \qquad (41)$$

With the phase $\phi$ determined for a pixel in the samples y, and with the spectral component C determined (such as whether the resulting resampling is for a red, green, or blue color component), at least one of the interpolation filters $h_{r,s}^{\phi,C}$ 2005, 2010 and 2015 (which may be dependent on the determined spectral component C) may be applied to the pixel image data of samplings y at vectorial location i to estimate $y_{b,i}(\hat{y}_{b,i})$ for the resampled Bayer pattern image data 2004.

The interpolation filters $h_{r,s}^{\emptyset,C}$ may have a compact support, where filter coefficients decay rapidly relative to the distance from the center pixel of the samples (i.e., the value of a resampling at a pixel location i is more dependent on values of samples y closer to location i than values further from location i). In other words, the spectral estimation at a given pixel location is a function of the spectral values in the near spatial vicinity of where the resampling is currently being performed (i.e., the resampling of a pixel i may not be dependent on pixel values a threshold distance from the pixel, and thus be bounded). In some example implementations, the resampling may be exclusively dependent on the pixel and the pixel's immediate neighbors. As a result, the resampling filters may estimate $y_b$ with sufficient accuracy without iterative computations (through non-iterative filtering).

In some example implementations, since the resampling matrix may be a BCCB matrix, the matrix may be determined by estimating only the first $p^2$ columns of the matrix (e.g., estimating the $N^2 \times p^2$ size sub-matrix $C^R$), which may be the sampling filter.

In some example implementations of a sampling filter, and referring back to equation (35), H may be an inverse matrix for a CFA pattern, and the columns of H may represent responses of the linear system x=Hy to spatially shifted unit impulses. The sub-matrix $C^H$ denotes the sub-matrix formed by the first $p^2$ columns of matrix H. The first $p^2$ columns of the resampling matrix ($C^R$) may thus be an example sampling filter and denoted as depicted in equation (42) below:

$$C^R = A_b C^H \quad (42)$$

With the spatio-spectral operator $A_b$ known, if the sub-matrix $C^H$ is known, the sub-matrix of the resampling matrix R may be determined. Sub-matrix $C^H \triangleq [c_0^H, c_1^H, \ldots, c_{p^2-1}^H]$ may be determined column-by-column. The i-th column of sub-matrix $C^H$ may be computed based on equation (43) below:

$$c_i^H = \arg\min_{x \in \mathbb{R}^{3N^2}} \left\{ \frac{1}{2\sigma^2}\|e_j - Ax\|^2 + \frac{1}{2\sigma_l^2} x^T T_l^T B T_l x + \frac{1}{2\sigma_c^2} \sum_{k=1,2} x^T T_{c_k}^T B T_{c_k} x \right\}, \quad (43)$$

where $e_j$ represents the j-th unit vector for location $j \in \{0, \ldots, p^2-1\}$ in column i.

In one aspect of determining $c_i^H$, since the matrix H may be symmetric and positive-definite, a conjugate gradient method may be used to solve equation (43) for each $i \in \{0, \ldots, p^2-1\}$ in determining the sub-matrix $C^H$.

With $A_b$ and $C^H$ determined or known, $C^R$ may be determined using Equation 42 above. The $C^R$ may then be used to construct the entire resampling matrix R. For example, the sub-matrix $C^R$ may be repeated for other columns in constructing the resampling matrix R.

In constructing the resampling matrix, the first $p^2$ rows defined by the sub-matrix $\mathcal{R}^R \in \mathbb{R}^{p^2 \times N^2}$ are determined. In some example implementations, each of the $p^2$ rows of $\mathcal{R}^R$ may be arranged as a 2D filter for estimating a missing spectral component at a specific phase for resampling.

In evaluating the performance of the proposed resampler, the set of standard 24 Kodak® color images may be used. The full 3-channel RGB images are first color-subsampled according to the three patterns shown in FIGS. 1-3 to simulate the image data from sampling (CFA observation images).

The Bayer CFA raw images are demosaiced using an adaptive homogeneity demosaic (AHD) algorithm, such as proposed by K. Hirakawa and T. Parks ("Adaptive Homogeneity-directed Demosaicing Algorithm." *Proc. IEEE Int. Conf. Image Processing*, pages 669-672)) for color interpolation of Bayer CFA images.

The modified 3×3 Bayer pattern (FIG. 2) and 4×4 Lukac pattern (FIG. 3) are first resampled to a Bayer pattern (2×2) grid and then demosaiced using the AHD algorithm.

The resampling matrices for both the modified 3×3 Bayer and 4×4 Lukac patterns are learned a priori column-by-column using Equation (43). The model parameters in Equation (43) are selected as follows:

$\sigma = 0.5$;
$\sigma_l = 1.5$;
$\sigma_c = 1.0$;
GMRF Precision matrix B 2100 as shown in FIG. 21; and
ITU-R BT.601 transform for channel decorrelation.

Since the resampling matrices for both the CFA patterns (the 3×3 Bayer and 4×4 Lukac patterns) are BCCB, a set of 9 interpolation filters (i.e., $3^2$) may be determined for resampling the modified 3×3 Bayer patterns and a separate set of 16 interpolation filters (i.e., $4^2$) may be determined for resampling the Lukac patterns to Bayer pattern CFA data. The filter support is selected as 11×11, and the small non-zero values outside such support may be discarded.

Referring again to FIG. 20, the resampling may be implemented in real-time (or near-real time). In FIG. 20, the periodicity of the input CFA array is 3×3. The periodicity of the output Bayer CFA array is 2×2. A pixel of interest #15 has the 2D spatial coordinates (r, s)=(2, 3). The vectorial location of the pixel of interest in the input CFA image 2002 (as computed using Equation (27)) is i=15 (circled in the input CFA image 2002 and the output Bayer CFA image 2004). The phases of the pixel of interest in the input and output CFA patterns, determined using Equations (28) and (40), respectively, are $\Phi=6$ and $\Phi_b=1$. For $\Phi_b$, the desired spectral value on the Bayer CFA grid is C=R. Thus the selected filter to estimate $y_{b,15}$ is $h^{6,R}_{m,n}$ form in r and n in s.

The performance of the non-iterative MAP-based Bayer CFA resampling illustrated in FIG. 20 may be evaluated across the test set of 24 images using the peak signal-to-noise ratio (PSNR) objective measure of image quality, as illustrated in Table A below:

TABLE A

Reconstruction PSNR values for the CFA patterns shown in FIGS. 1-3

| Quality Measure | Bayer | Modified Bayer | Lukac |
|---|---|---|---|
| PSNR (db) | 37.81 | 37.12 | 37.51 |

The average reconstruction PSNRs for the three CFA patterns shown in FIGS. 1, 2 and 3 is similar, confirming the effectiveness of the non-iterative MAP-based Bayer CFA resampling.

The technology described herein is operational with numerous other general purpose or special purpose computing system environments or configurations. Examples of well-known computing systems, environments, and/or configurations that may be suitable for use herein include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions may refer to computer-implemented steps for processing information in the system. Instructions can be implemented in software, firmware or hardware, and include any type of programmed step undertaken by components of the system.

A processor may be any conventional general-purpose single- or multi-chip processor such as a Pentium® processor, a Pentium® Pro processor, an 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®. The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Various illustrative logical blocks, modules, circuits, and steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example implementations, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and implementations have been disclosed herein, other aspects and embodiments will be apparent to those skilled in the art. The various aspects and embodiments disclosed herein are for purposes of illustration and are not intended to be limiting.

Further, the term "coupled" as used herein means connected directly to or connected through one or more intervening components or circuits. Also, in the description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, the disclosure is not limited to the illustrated examples and any means for performing the functionality described herein are included in aspects of the disclosure.

What is claimed is:

1. A device, comprising:
   a camera comprising an image sensor with a non-Bayer pattern color filter array configured to capture non-Bayer pattern image data for an image;
   a memory; and
   a processor coupled to the memory and configured to:
      receive the non-Bayer pattern image data from the image sensor;
      divide the non-Bayer pattern image data into portions;
      determine a sampling filter corresponding to the portions; and
      determine, based on the determined sampling filter, a resampler for converting non-Bayer pattern image data to Bayer-pattern image data.

2. The device of claim 1, wherein the portions of the non-Bayer image data are of uniform size.

3. The device of claim 2, wherein the processor is further configured to:
   output the determined resampler for storage, wherein the resampler is used for converting future non-Bayer pattern image data captured by the image sensor.

4. The device of claim 2, wherein the processor is further configured to:
   determine the resampler as a set of linear operations defined in a resampling matrix form; and
   determine the sampling filter as a subset of linear operations defined as a portion of the resampling matrix.

5. The device of claim 4, wherein the processor is further configured to:
   determine the sampling filter as a first $p^2$ columns of the resampling matrix, wherein a size of a color filter array unit cell for the non-Bayer pattern image data is p×p values.

6. The device of claim 5, wherein the processor is further configured to:
   determine an inverse operator for converting the non-Bayer pattern image data to original image data for the image, wherein the inverse operator is used for determining the sampling filter.

7. The device of claim 6, wherein the processor is further configured to:
   determine a first $p^2$ columns of the inverse operator, wherein:

the inverse operator is defined as an inverse matrix H;
the first $p^2$ columns of the inverse operator is a sub-matrix $C^H$ of the inverse matrix H;
a spatio-spectral operator $A_b$ for mapping the image to the Bayer-pattern image data is known; and
the sampling filter $C^R$ is $A_b C^H$.

8. The device of claim 7, wherein the processor is further configured to:
determine the sub-matrix $C^H$ column by column, wherein $$C^H \triangleq [c_0^H, c_1^H, \ldots, c_{p^2-1}^H]$$

and $$c_i^H = \arg\min_{x \in \mathbb{R}^{3N^2}} \left\{ \frac{1}{2\sigma^2} \|e_j - Ax\|^2 + \frac{1}{2\sigma_i^2} x^T T_i^T BT_i x + \frac{1}{2\sigma_c^2} \sum_{k=1,2} x^T T_{c_k}^T BT_{c_k} x \right\}$$

for $i \in \{0, \ldots, p^2-1\}$ where $e_j$ represents a j-th unit vector for location $j \in \{0, \ldots, p^2-1\}$ in column i.

9. A method, comprising:
capturing, by an image sensor with a non-Bayer pattern color filter array, non-Bayer pattern image data for an image;
dividing the non-Bayer pattern image data into portions;
determining a sampling filter corresponding to the portions; and
determining, based on the determined sampling filter, a resampler for converting non-Bayer pattern image data to Bayer-pattern image data.

10. The method of claim 9, wherein the portions of the non-Bayer image data are of uniform size.

11. The method of claim 10, further comprising:
storing the resampler for use in converting future non-Bayer pattern image data captured by the image sensor.

12. The method of claim 10, further comprising:
determining the resampler as a set of linear operations defined in a resampling matrix form; and
determining the sampling filter as a subset of linear operations defined as a portion of the resampling matrix.

13. The method of claim 12, further comprising:
determining the sampling filter as a first $p^2$ columns of the resampling matrix, wherein a size of a color filter array unit cell for the non-Bayer pattern image data is p×p values.

14. The method of claim 13, further comprising:
determining an inverse operator for converting the non-Bayer pattern image data to original image data for the image, wherein the inverse operator is used for determining the sampling filter.

15. The method of claim 14, further comprising:
determining a first $p^2$ columns of the inverse operator, wherein:
the inverse operator is defined as an inverse matrix H;
the first $p^2$ columns of the inverse operator is a sub-matrix $C^H$ of the inverse matrix H;
a spatio-spectral operator $A_b$ for mapping the image to the Bayer-pattern image data is known; and
the sampling filter $C^R$ is $A_b C^H$.

16. The method of claim 15, further comprising:
determining the sub-matrix $C^H$ column by column, wherein $$C^H \triangleq [c_0^H, c_1^H, \ldots, c_{p^2-1}^H]$$

and $$c_i^H = \arg\min_{x \in \mathbb{R}^{3N^2}} \left\{ \frac{1}{2\sigma^2} \|e_j - Ax\|^2 + \frac{1}{2\sigma_i^2} x^T T_i^T BT_i x + \frac{1}{2\sigma_c^2} \sum_{k=1,2} x^T T_{c_k}^T BT_{c_k} x \right\}$$

for $i \in \{0, \ldots, p^2-1\}$ where $e_j$ represents a j-th unit vector for location $j \in \{0, \ldots, p^2-1\}$ in column i.

17. A non-transitory computer-readable medium storing one or more programs containing instructions that, when executed by one or more processors of a device, cause the device to perform operations comprising:
capturing, by an image sensor with a non-Bayer pattern color filter array, non-Bayer pattern image data for an image;
dividing the non-Bayer pattern image data into portions;
determining a sampling filter corresponding to the portions; and
determining, based on the determined sampling filter, a resampler for converting non-Bayer pattern image data to Bayer-pattern image data.

18. The computer-readable medium of claim 17, wherein the portions of the non-Bayer image data are of uniform size.

19. The computer-readable medium of claim 18, wherein the instructions cause the device to perform operations further comprising:
storing the resampler for use in converting future non-Bayer pattern image data captured by the image sensor.

20. The computer-readable medium of claim 18, wherein the instructions cause the device to perform operations further comprising:
determining the resampler as a set of linear operations defined in a resampling matrix form; and
determining the sampling filter as a subset of linear operations defined as a portion of the resampling matrix.

21. The computer-readable medium of claim 20, wherein the instructions cause the device to perform operations further comprising:
determining the sampling filter as a first $p^2$ columns of the resampling matrix, wherein a size of a color filter array unit cell for the non-Bayer pattern image data is p×p values.

22. The computer-readable medium of claim 21, wherein the instructions cause the device to perform operations further comprising:
determining an inverse operator for converting the non-Bayer pattern image data to original image data for the image, wherein the inverse operator is used for determining the sampling filter.

23. The computer-readable medium of claim 22, wherein the instructions cause the device to perform operations further comprising:
determining a first $p^2$ columns of the inverse operator, wherein:

the inverse operator is defined as an inverse matrix H;
the first $p^2$ columns of the inverse operator is a sub-matrix $C^H$ of the inverse matrix H;
a spatio-spectral operator $A_b$ for mapping the image to the Bayer-pattern image data is known; and
the sampling filter $C^R$ is $A_b C^H$.

24. The computer-readable medium of claim 23, wherein the instructions cause the device to perform operations further comprising:
determining the sub-matrix $C^H$ column by column, wherein $$C^H \triangleq [c_0^H, c_1^H, \ldots, c_{p^2-1}^H] \text{ and}$$

$$c_i^H = \arg\min_{x \in \mathbb{R}^{3N^2}} \left\{ \frac{1}{2\sigma^2} \|e_j - Ax\|^2 + \frac{1}{2\sigma_l^2} x^T T_l^T B T_l x + \frac{1}{2\sigma_c^2} \sum_{k=1,2} x^T T_{c_k}^T B T_{c_k} x \right\}$$

for $i \in \{0, \ldots, p^2 - 1\}$ where $e_j$ represents a j-th unit vector for location $j \in \{0, \ldots, p^2-1\}$ in column i.

25. A device, comprising:
means for receiving non-Bayer pattern image data for an image from an image sensor with a non-Bayer pattern color filter array;
means for dividing the non-Bayer pattern image data into portions;
means for determining a sampling filter corresponding to the portions; and
means for determining, based on the determined sampling filter, a resampler for converting non-Bayer pattern image data to Bayer-pattern image data.

26. The device of claim 25, further comprising:
means for storing the determined resampler for use in converting future non-Bayer pattern image data captured by the image sensor.

27. The device of claim 25, further comprising:
means for determining the resampler as a set of linear operations defined in a resampling matrix form; and
means for determining the sampling filter as a subset of linear operations defined as a portion of the resampling matrix.

28. The device of claim 27, further comprising:
means for determining the sampling filter as a first $p^2$ columns of the resampling matrix, wherein a size of a color filter array unit cell for the non-Bayer pattern image data is p×p values.

29. The device of claim 28, further comprising:
means for determining an inverse operator for converting the non-Bayer pattern image data to original image data for the image, wherein the inverse operator is used for determining the sampling filter.

30. The device of claim 29, further comprising:
means for determining a first $p^2$ columns of the inverse operator, wherein:
the inverse operator is defined as an inverse matrix H;
the first $p^2$ columns of the inverse operator is a sub-matrix $C^H$ of the inverse matrix H;
a spatio-spectral operator $A_b$ for mapping the image to the Bayer-pattern image data is known; and
the sampling filter $C^R$ is $A_b C^H$.

* * * * *